United States Patent
Herr et al.

(10) Patent No.: US 6,201,087 B1
(45) Date of Patent: *Mar. 13, 2001

(54) COUMARIN AND QUINOLINONE DERIVATIVES FOR THE PRODUCTION OF ORIENTING LAYERS FOR LIQUID CRYSTALS

(75) Inventors: Rolf Peter Herr, Lörrach (DE); François Herzog, Richwiller (FR); Andreas Schuster, Freiburg (DE)

(73) Assignee: Rolic AG, Zug (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,436
(22) PCT Filed: Sep. 19, 1995
(86) PCT No.: PCT/CH95/00209
  § 371 Date: Mar. 27, 1997
  § 102(e) Date: Mar. 27, 1997
(87) PCT Pub. No.: WO96/10049
  PCT Pub. Date: Apr. 4, 1996

(30) Foreign Application Priority Data

Sep. 29, 1994 (CH) .................................................. 2951/94

(51) Int. Cl.[7] .......................... C08F 34/02; C08F 24/00; C08F 26/10
(52) U.S. Cl. .................. 526/268; 526/258; 526/259; 526/263; 526/264; 526/265; 526/266; 526/267
(58) Field of Search ............................ 526/268, 266, 526/258, 264, 265

(56) References Cited

U.S. PATENT DOCUMENTS

| | | | |
|---|---|---|---|
| 3,969,323 | * 7/1976 | Furrer | 526/266 |
| 3,980,617 | * 9/1976 | Jacquet | 526/266 |
| 4,107,290 | * 8/1978 | Jacquet | 424/74 |
| 4,974,941 | 12/1990 | Gibbons et al. | |
| 5,212,269 | * 5/1993 | Fischer | 526/266 |
| 5,286,803 | * 2/1994 | Lindsay | 525/329.7 |
| 5,587,444 | * 12/1996 | Uchida et al. | 526/247 |

FOREIGN PATENT DOCUMENTS 0 445 629 A2  11/1991  (EP) .
959679  6/1964  (GB) .

OTHER PUBLICATIONS

Schadt et al, "Surface–Induced Parallel Alignment of Liquid Crystals by Linearly Polymerized Photopolymers," *Jpn. J. Appl. Phys.*, vol. 31 (1992) pp. 2155–2164.

Ichimura et al, "Photocontrol of In–plane Alignment of a Nematic Liquid Crystal by a Photochromic Spiropyran Monolayer Absorbing Linearly Polarized Light," *Chemistry Letters*, 1992, pp. 1063–1066.

Ichimura et al, "Reversible Change in Alignment Mode of Nematic Liquid Crystals Regulated Photochemically by 'Command Surfaces' Modified with an Azobenzene Monolayer," *Langmuir*, 1988, vol. 4, No. 5, pp. 1214–1216.

* cited by examiner

*Primary Examiner*—Fred Zitomer
(74) *Attorney, Agent, or Firm*—Finnegan, Henderson, Farabow, Garrett and Dunner, L.L.P.

(57) ABSTRACT

A polymer having the formula

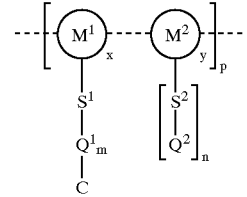

wherein $M^1$ and $M^2$ signify monomer units for homo- or copolymers. "x" and "y" indicate the mole fractions of the comonomers, with in each case $0 < x \leq 1$ and $0 \leq y < 1$ and $x+y=1$. The symbol "p" signifies 4 to 30,000 and "$S^1$" and "$S^2$" signify spacer units. "$Q^1$" signifies a structural unit of the formula $-A-(Z^1-B)_z-Z^2-$ and "$Q^2$" signifies a structural unit of the formula $-A-(Z^1-B)_zR^1$. "A" and "B" each independently signify pyridine-2,5-diyl, pyrimidine-2,5-diyl, 1,4—Cyclohexylene,1,3-dioxane-2,5-diyl or optionally substituted 1,4-phenylene. "Z" and "$Z^2$" each independently signify a single covalent bond selected from the group consisting of $-CH_2-ch_2-$, $-CH_2O-$, $-OCH_2-$, $-CONR-$, $-RNCO-$, $-COO-$ or $-OOC-$. "R" signifies either a hydrogen or lower alkyl, where "$R^1$" signifies hydrogen, optionally substituted alkyl or alkoxy, each having 1 to 12 carbon atoms, cyano, nitro or halogens. "z" is either 0 or 1 and "C" is either a photochemically dimerizable coumarin or quinoline derivative. Finally, "m" and "n" are each independently 0 or 1.

14 Claims, No Drawings

COUMARIN AND QUINOLINONE DERIVATIVES FOR THE PRODUCTION OF ORIENTING LAYERS FOR LIQUID CRYSTALS

The invention is concerned with novel linear and cyclic polymers or oligomers of coumarin and quinolinone derivatives having a photoreactive ethene group as well as their use as orienting layers for liquid crystals.

The orienting layer has a particular significance in (electro-optical) liquid crystal indicators. It serves the purpose of guaranteeing a uniform and trouble-free alignment of the molecular axes and thus guarantees a high contrast. The alignment of the liquid crystals in such indicators can be brought about in different ways. It is usually effected by rubbing a glass plate which is coated with an organic polymer layer or by obliquely vaporizing a glass plate with a silicon oxide layer. Aligned layers which are essentially uniform can be produced in this manner.

It is, however, also possible to obtain a structured orientation of the liquid crystals. This can be achieved, for example, by coating a glass plate with a polymer containing admixed photochemically-orientable colouring molecules or photochemically-isomerizable molecules, as is described, for example, in EP-A-0 445 629. However, these methods have the disadvantage that on the one hand the solubility of such orientable molecules in the polymer is limited and on the other hand the stability of the orientation in the long term can not be guaranteed to a sufficient extent.

A further possibility for the production of high resolution orientation patterns in liquid crystal layers is described in Jpn. J. Appl. Phys. Vol. 31 (1992), 2155. Dimerization of polymer-bonded photoreactive cinnamic acid groups induced by irradiation with linear polarized light for the structured orientation of liquid crystals is used in this procedure.

These polymers are, however, still not optimal. Photochemical concurrent (side) reactions as bring about trans/cis isomerism are disturbing to the orientation capacity and long-term stability. For example, a longer irradiation with UV light of an already finished orienting layer leads to the destruction of the originally present orientation. Multiple irradiations in which an already existing orienting layer having a predetermined registered pattern is irradiated once more in order to orientate the still non-irradiated region in another direction can only be carried out when the previously irradiated sites are covered by a mask. Otherwise, the already oriented regions of the layer can lose their structure by photochemical side-reactions.

The task is therefore to search for photoreactive polymers which are capable of producing high resolution orienting patterns and which lead to significantly more stable orienting structures for liquid crystalline materials.

It has surprisingly been found that polymers which contain coumarin or quinolinone derivatives as photoreactive units fulfil these requirements and are excellently suited as orienting layers for liquid crystals. In addition to a significantly higher (e.g. photochemical) stability of the orienting layer a substantially improved orienting of the liquid crystal is achieved and this leads e.g. to a clearly improved contrast.

The object of the present invention is accordingly polymers of the general formula

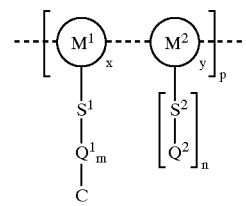

wherein $M^1$ and $M^2$ signify monomer units for homo- or copolymers;

x and y indicate mole fractions of the comonomers, with in each case $0 < x \leq 1$ and $0 \leq y < 1$ and $x+y=1$;

p signifies 4 to 30,000;

$S^1$ and $S^2$ signify spacer units;

$Q^1$ signifies a structural unit of the formula $$—A—(Z^1—B)_z—Z^2—  \qquad\qquad \text{IIa;}$$

$Q^2$ signifies a structural unit of the formula $$—A—(Z^1—B)_z—R^1—  \qquad\qquad \text{IIb;}$$

A and B each independently signify pyridine-2,5-diyl, pyrimidine-2,5-diyl, 1,4-cyclohexylene, 1,3-dioxane-2,5-diyl or optionally substituted 1,4-phenylene;

$Z^1$ and $Z^2$ each independently signify a single covalent bond, $—CH_2\text{-}ch_2—$, $—CH_2O—$, $—OCH_2—$, $—CONR—$, $—RNCO—$, $—COO—$ or $—OOC—$;

R signifies hydrogen or lower alkyl;

$R^1$ signified hydrogen, optionally substituted alkyl or alkoxy with in each case 1 to 12 carbon atoms, cyano, nitro or halogen;

z signifies 0 or 1;

C signifies a photochemically dimerizable coumarin or quinolinone derivative; and m and n each independently signify 0 or 1.

The monomer units $M^1$ and $M^2$ set forth in general formula I are units for the formation of homopolymers or copolymers and have—in the scope of the present invention—the structures which are usual in polymer chemistry. Such monomer units are, for example, ethylene, acrylate, methacrylate, 2-chloroacrylate, 2-phenylacrylate, acryloylphenylene, acrylamide, methacrylamide, 2-chloroacrylamide, 2-phenylacrylamide, vinyl ether, vinyl ester, styrene derivative, maleic acid derivative, fumaric acid derivative, itaconic acid derivative, siloxane, epoxide, ethyleneimine derivative and the like.

When n=0, $M^2$ can also signify acrylonitrile, methacrylonitrile, methylacrylate, methylmethacrylate, hydroxyalkylacrylate or hydroxyalkylmethacrylate.

Preferred monomer units are acrylate, methacrylate, 2—Chloroacrylate, acrylamide, methacrylamide, 2-chloroacrylamide, styrene derivative, maleic acid derivative or siloxane.

Under the term "copolymers" there are to be understood not only statistical copolymers, for example from different acrylic acid and methacrylic acid derivatives, but also alternating copolymers, for example alternating copolymers from maleic acid derivatives with styrene or vinyl ethers. Statistical copolymers are preferably used. Homopolymers embrace linear and cyclic polymers such as, for example, cyclic polysiloxanes.

The spacer units $S^1$ and $S^2$ link the individual units with one another. Thus, spacer $S^1$ links the monomer unit with the compound of formula IIa ($Q^1$) or, where m=0, with the coumarin or quinolinone derivative (C), while $S^2$ links the monomer unit $M^2$ with the compound of formula IIb ($Q^2$). Compound $Q^1$ is linked by $Z^2$ with the coumarin or quinolinone derivative C.

Such spacer units are known per se. The term "spacer units" embraces in the scope of the present invention a single covalent bond, —(CH$_2$)$_s$—, —O(CH$_2$)$_s$—, —(CH$_2$)$_s$O—, —O(CH$_2$)$_s$O—, —OOC(CH$_2$)$_s$—, —COO(CH$_2$)$_s$—, —(CH$_2$)$_s$COO—, —(CH$_2$)$_s$OOC— or —(CH$_2$)$_s$NR$^2$—, wherein s is a whole number of 1 to 12, preferably 1 to 8, carbon atoms, one of the —CH$_2$— groups can be replaced by —CHR$^3$—, R$^2$ signifies hydrogen or lower alkyl, especially hydrogen, and R$^3$ signifies lower alkyl; cycloalkylene with 3 to 8, preferably 5 or 6, carbon atoms, piperidinediyl, piperazinediyl, phenylene, which can be substituted with lower alkyl, lower alkoxy, cyano, nitro or halogen; other spacer units are carbonate (—OCOO—), ester (—COO—, —OOC—), amide (—CONR$^2$—, —R$^2$NCO—), ether (—O—), amino (—NR$^2$—), carboxylamine (—OCONR$^2$—, —R$^2$NCOO—) or urea (—R$^2$NCONR$^4$—), in which R$^4$ signifies hydrogen or a lower alkyl, especially hydrogen.

Spacer units can be especially also a combination of the mentioned groups. Thus, for example, the amide function of acrylamide or the ester function of methacrylic acid can be looked upon as part of the spacer. Likewise, for example, an alkyl group can be combined with a carboxyl, an ether or amino group to an alkylcarboxyl, or alkyloxycarbonyl, an alkoxy, an alkylamino spacer or also to a 4-hydroxy-piperidinyl spacer.

Examples of preferred spacer units are the single bond, methylene, 1,2-ethylene, 1,3-propylene, 1,4-butylene, 1,5-pentylene, 1,6-hexylene, 1,7-heptylene, 1,8-octylene 1,2-propylene, 1,3-butylene, cyclopentane-1,2-diyl, cyclopentane-1,3-diyl, cyclohexane-1,3-diyl, cyclohexane-1,4-diyl, piperidine-1,4-diyl, piperazine-1,4-diyl, 1,2-phenylene, 1,3-phenylene, 1,4-phenylene, ethyleneoxy, ethyleneoxycarbonyl, ethylenecarboxyl, propyleneoxy, propyleneoxycarbonyl, propylenecarboxyl, butyleneoxy, butyleneoxycarbonyl, butylenecarboxyl, pentyleneoxy, pentyleneoxycarbonyl, pentylenecarboxyl, hexyleneoxy, hexyleneoxycarbonyl, hexylenecarboxyl, heptyleneoxy, heptyleneoxycarbonyl, heptylenecarboxyl, octyleneoxy, octyleneoxycarbonyl, octylenecarboxyl, ethylamino, propylamino, butylamino, pentylamino, hexylamino, heptylamino, octylamino and the like.

"Lower alkyl" and, respectively, "lower alkoxy" denote residues with 1 to 5, preferably with 1 to 3, carbon atoms, such as methyl, ethyl, propyl, i-propyl, and, respectively, methoxy, ethoxy, propyloxy or i-propyloxy.

The term "optionally substituted 1,4-phenylene" embraces in the scope of the compounds IIa and IIb unsubstituted 1,4-phenylene or 1,4-phenylene mono- or multiply-substituted with halogen, preferably with fluorine or chlorine, or with methyl, methoxy or cyano, such as, for example, 2- or 3-fluoro-1,4-phenylene, 2,3-, 2,6- or 3,5-difluoro-1,4-phenylene, 2- or 3-chloro-1,4-phenylene, 2,3-, 2,6- or 3,5-dichloro-1,4-phenylene, 2- or 3-methyl-1,4-phenylene, 2,3-, 2,6- or 3,5-dimethyl-1,4 -phenylene, 2- or 3-methoxy-1,4-phenylene, 2,6- or 3,5-dimethoxy-1,4-phenylene, 2- or 3-cyano-1,4-phenylene, and the like.

The term "optionally substituted alkyl or alkoxy with in each case 1 to 12 carbon atoms" signifies in the scope of the present invention straight-chain or branched, optionally chiral alkyl or alkoxy with 1 to 12, preferably with 1 to 6, carbon atoms, which can also be mono- or multiply-substituted with halogen, preferably fluorine or chlorine, or with cyano. Preferred residues are methyl, ethyl, propyl, butyl, pentyl, hexyl, i-propyl, 1-methylpropyl, 2-methylpropyl, 1-methylbutyl, 2-methylbutyl, 3-methylbutyl, 3-methylpentyl, methoxy, ethoxy, propyloxy, butyloxy, pentyloxy, hexyloxy, 1-methylpropyloxy, 2-methylpropyloxy, 1-methylbutyloxy, 2-methylbutyloxy, 3-methylbutyloxy, 1-fluoropropyl, 1-fluoropentyl, 2-fluoropropyl, 2,2-difluoropropyl, 3-fluoropropyl, 3,3-difluoropropyl, 3,3,3-trifluoropropyl, 2-fluoropropyloxy, 3-fluoropropyloxy, trifluoromethyl, trifluoromethoxy, 1-chloro-2-methylbutyl, 1-cyanohexyl, 1-chloro-2-methylbutyloxy, 1-cyanohexyloxy, and the like.

The term "halogen" denotes in the scope of the present invention fluorine, chlorine, bromine and iodine, but especially fluorine and chlorine.

The term "photochemically dimerizable coumarin or quinolinone derivative" embraces in the scope of the present invention coumarin and quinolinone derivatives of the general formulae:

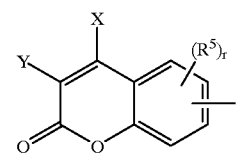

III-A

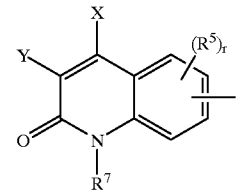

III-B which can be linked in the 5-, 6-, 7- or 8-position with the spacer $S^1$ or $Q^1$, and in which R$^5$ signifies optionally substituted alkyl or alkoxy with in each case 1 to 12 carbon atoms, halogen, cyano or nitro;

R$^7$ signifies hydrogen or lower alkyl;

X signifies hydrogen, alkyl or alkoxy with in each case 1 to 8 carbon atoms, trifluoromethyl or optionally substituted phenyl;

Y signifies hydrogen, alkyl or alkoxy with in each case 1 to 8 carbon atoms, cyano or —COOR$^6$;

R$^6$ signifies lower alkyl; and r signifies a whole number of 1 to 3.

The compounds of formula III-A and III-B are referred to hereinafter as hemi-coumarin derivatives for the sake of simplicity.

Especially preferred polymers are copolymers of the formula

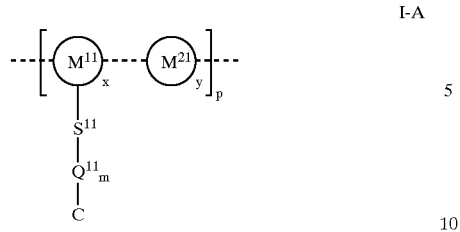

I-A

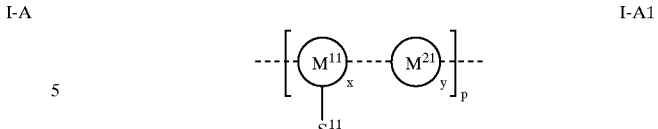

I-A1

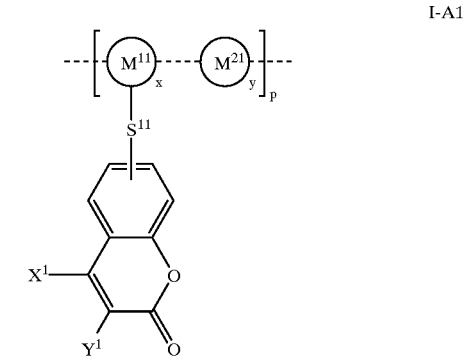

I-A2

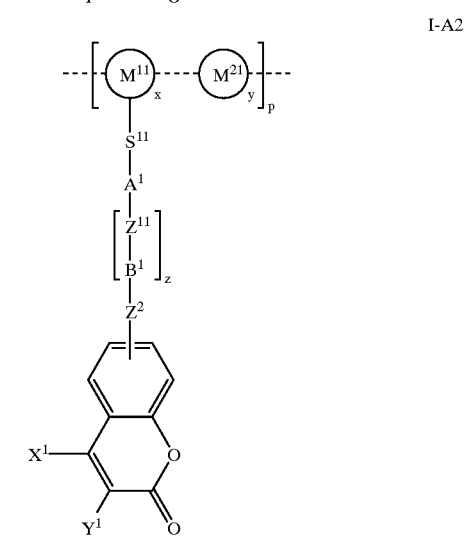

wherein $M^{11}$ and $M^{21}$ each independently signify ethylene, acrylate, methacrylate, 2-chloroacrylate, acrylamide, methacrylamide, 2-chloroacrylamide, styrene derivative, maleic acid derivative, siloxane, and $M^{21}$ can also signify acrylonitrile, methacrylonitrile, methylacrylate, methylmethacrylate, hydroxyalkylacrylate or hydroxyalkylmethacrylate;

$S^{11}$ signifies a single covalent bond, —$(CH_2)_t$—, —$O(CH_2)_t$—, —$(CH_2)_tO$—, —$O(CH_2)_tO$—, —$OOC(CH_2)_t$—, —$COO(CH_2)_t$—, —$(CH_2)_tCOO$—, —$(CH_2)_tOOC$—, —$(CH_2)_tNR^2$—, cycloalkylene with 5 or 6 carbon atoms, piperidinediyl, piperazinediyl, phenylene, carbonate (—OCOO—), ester (—COO—, —OOC—), amide (—$CONR^2$—, —$R^2NCO$—), ether (—O—), amino (—$NR^2$—) or a combination of these groups;

t signifies a whole number of 1 to 6;

$Q^{11}$ signifies —$A^1$—$(Z^{11}$—$B^1)_z$—$Z^2$— IIa-1;

$A^1$ and $B^1$ each independently signify 1,4-phenylene, pyridine-2,5-diyl, pyrimidine-2,5-diyl, 1,4-cyclohexylene or 1,3-dioxane-2,5-diyl, with the proviso that not more than one of rings $A^1$ and $B^1$ signifies a heterocycle;

$z^{11}$ signifies a single covalent bond, —$CH_2CH_2$—, —COO— or —OOC—; and $R^2$, p, C, $Z^2$ and z have the significances set forth above.

Especially preferred are copolymers of formula I-A in which $M^{11}$ and $M^{21}$ each independently signify ethylene, acrylate, methacrylate, acrylamide, methacrylamide, styrene derivative; and $M^{21}$ can also signify acrylonitrile, methacrylonitrile, methylacrylate, methylmethacrylate, hydroxyalkylacrylate or hydroxyalkylmethacrylate; $S^{11}$ signifies a single covalent bond, —$(CH_2)_t$—, —$O(CH_2)_t$—, —$(CH_2)_tO$—, —$O(CH_2)_tO$—, —$OOC(CH_2)_t$—, —$COO(CH_2)_t$—, —$(CH_2)_tCOO$—, —$(CH_2)_tOOC$—, —$(CH_2)_tNR^2$—, cycloalkylene with 5 or 6 carbon atoms, phenylene, carbonate (—OCOO—), ester (—COO—, —OOC—), amide (—$CONR^2$—, —$R^2NCO$—), ether (—O—), amino (—$NR^2$—) or a combination of these groups; and $A^1$ and $B^1$ each independently signify 1,4-phenylene, pyridine-2,5-diyl, pyrimidine-2,5-diyl or 1,4-cyclohexylene, with the proviso that not more than one of rings $A^1$ and $B^1$ signifies a heterocycle;

Especially preferred copolymers are those in which the coumarin derivative is linked in the 6- or 7-position with the spacer $S^{11}$ or $Z^2$, for example copolymers of the formulae wherein $X^1$ signifies hydrogen, alkyl or alkoxy with in each case 1 to 4 carbon atoms or trifluoromethyl;

$Y^1$ signifies hydrogen, alkyl or alkoxy with in each case 1 to 4 carbon atoms; and the remaining symbols have the significances set forth above.

Quite especially preferred are polymers of formula I-A1 and I-A2 in which $Y^1$ signifies hydrogen or alkyl with 1 to 4 carbon atoms; $M^{11}$ and $M^{21}$ signify ethylene, acrylate, methacrylate or styrene and $M^{21}$ can also signify hydroxyalkylacrylate or hydroxyalkylmethacrylate; $A^1$ and $B^1$ signify phenylene or cyclohexylene; and $S^{12}$ signifies a single covalent bond, —$(CH_2)_t$—, —$(CH_2)_tO$—, —$(CH_2)_tCOO$—, —$(CH_2)_tOOC$—, —$(CH_2)_tNR^2$—, or amino (—$NR^2$—).

In particular, there are preferred copolymers of formulae I, I-A1 and I-A2 in which the coumarin derivative of formula III-A is linked in the 7-position with the spacer $S^{11}$ or with $Z^2$; $X^1$ in this connection preferably signifies hydrogen or methyl and $Y^1$ preferably signifies hydrogen.

Especially preferred polymers in the scope of the present invention are also the homopolymers of the formula

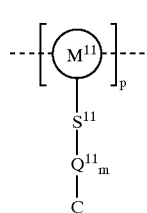

I-B wherein $M^{11}$ signifies ethylene, acrylate, methacrylate, 2-chloroacrylate, acrylamide, methacrylamide, 2-chloroacrylamide, styrene derivative, maleic acid derivative or siloxane, and $M^{21}$ can also signify acrylonitrile, methacrylonitrile, methylacrylate, methylmethacrylate, hydroxyalkylacrylate or hydroxyalkylmethacrylate;

$S^{11}$ signifies a single covalent bond, —(CH$_2$)$_t$—, —O(CH$_2$)$_t$—, —(CH$_2$)$_t$O—, —O(CH$_2$)$_t$O—, —OOC(CH$_2$)$_t$—, —COO(CH$_2$)$_t$—, —(CH$_2$)tCOO—, —(CH$_2$)$_t$OOC—, —(CH$_2$)$_t$NR$^2$—, cycloalkylene with 5 or 6 carbon atoms, piperidinediyl, piperazinediyl, phenylene, carbonate (—OCOO—), ester (—COO—, —OOC—), amide (—CONR$^2$—, —R$^2$NCO—), ether (—O—), amino (—NR$^2$—) or a combination of these groups;

t signifies a whole number of 1 to 6;

$Q^{11}$ signifies —A$^1$—(Z$^{11}$—B$^1$)$_z$—Z$^2$— IIa-1

A$^1$ and B$^1$ each independently signify 1,4-phenylene, pyridine-2,5-diyl, pyrimidine-2,5-diyl, 1,4-cyclohexylene or 1,3-dioxane-2,5-diyl, with the proviso that not more than one of rings A$^1$ and B$^1$ signifies a heterocycle;

$Z^{11}$ signifies a single covalent bond, —CH$_2$CH$_2$—, —COO— or —OOC—; and

R$^2$, p, C, Z$^2$ and z have the significances set forth above.

Especially preferred are homopolymers of formula I-B in which $M^{11}$ signifies ethylene, acrylate, methacrylate, acrylamide, methacrylamide, styrene derivative; SI 1 signifies a single covalent bond, —(CH$_2$)$_t$—, —O(CH$_2$)$_t$—, —(CH$_2$)$_t$O—, —O(CH$_2$)$_t$O—, —OOC(CH$_2$)$_t$—, —COO(CH$_2$)$_t$—, —(CH$_2$)tCOO—, —(CH$_2$)$_t$OOC—, —(CH$_2$)$_t$NR$^2$—, cycloalkylene with 5 or 6 carbon atoms, phenylene, carbonate (—OCOO—), ester (—COO—, —OOC—), amide (—CONR$^2$—, —R$^2$NCO—), ether (—O—), amino (—NR$^2$—) or a combination of these groups; and A$^1$ and B$^1$ each independently signify 1,4-phenylene, pyridine-2,5-diyl, pyrimidine-2,5-diyl or 1,4-cyclohexylene, with the proviso that not more than one of rings A$^1$ and B$^1$ signifies a heterocycle;

Examples of especially preferred homopolymers are those in which the coumarin derivative is linked in the 6— or 7-position with the spacer $S^{11}$ or $Z^2$, i.e. compounds of the formulae

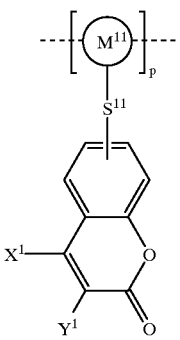

I-B1

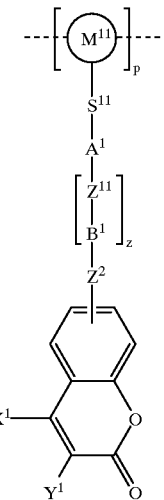

I-B2 wherein

X$^1$ signifies hydrogen, alkyl or alkoxy with in each case 1 to 4 carbon atoms or trifluoromethyl;

Y$^1$ signifies hydrogen, alkyl or alkoxy with in each case 1 to 4 carbon atoms; and the remaining symbols have the significances set forth above.

Especially preferred are polymers of formulae I-B1 and I-B2 in which X$^1$ signifies hydrogen, alkyl or alkoxy with in each case 1 to 4 carbon atoms; Y$^1$ signifies hydrogen or alkyl with 1 to 4 carbon atoms; $M^{11}$ signifies ethylene, acrylate, methacrylate or styrene; A$^1$ and B$^1$ signify phenylene or cyclohexylene; and $S^{12}$ signifies a single covalent bond, —(CH$_2$)$_t$—, —(CH$_2$)$_t$O—, —(CH$_2$)$_t$COO—, —(CH$_2$)$_t$OOC—, —(CH$_2$)$_t$NR$^2$—, or amino (—NR$^2$—).

In particular, there are preferred homopolymers of formulae I-B1 and l-B2 in which the coumarin derivative of formula III-A is linked in the 7-position with the spacer S$^1$, S$^{11}$ or with Z$^2$; $M^{11}$ signifies ethylene, acrylate or methacrylate; X$^1$ signifies hydrogen or methyl; and Y$^1$ signifies hydrogen. In polymers of formulae I-B1 and I-B2 $S^{11}$ preferably signifies a single covalent bond or —(CH$_2$)$_t$O—; and z is preferably 0.

The polymers of formula I are characterized by being readily accessible. The methods for their preparation will be known to a person skilled in the art.

In principle, the polymers of formula I can be prepared according to two different processes. In addition to the direct polymerization of pre-prepared monomers, there exists the possibility of polymer-like reaction on functional polymers.

For the direct polymerization, the monomers and the comonomers are firstly synthesized from the individual components, i.e. from a coumarin unit of formula III, the spacers ($S^1$, $S^2$), optionally a structure $Q^1$ or $Q^2$ of formula IIa or IIb and the polymerizable parts ($M^1$ or $M^2$). The formation of the polymers is carried out subsequently in a manner known per se. The polymerization can be carried out, for example, in the melt or in solution with the exclusion of oxygen and in the presence of a radical initiator which can generate radicals thermally, photochemically or by a Redox reaction. The reaction can be carried out in a temperature range of $-10°$ C. to $120°$ C., preferably in a range of $20°$ C. to $100°$ C.

In the second process a polymer of formula I can also be prepared in a polymer-like reaction from a pre-prepared functional polymer and a suitable functionalized coumarin derivative. The etherification of 6- or 7-hydroxy coumarin derivatives with polyhydroxyalkylacrylates or polyhydroxyalkylmethacrylates in solution under the conditions of the Mitsunobu reaction have been found to be especially advantageous in this case. This method of reaction is novel. Thereby, the reaction can, for example, also be carried out such that after the reaction free hydroxyl groups are still present on the polymer, which groups can then be further functionalized in an additional polymer-like reaction. The use of mixtures of a coumarin derivative with further phenolic building blocks is an alternative possibility for the preparation of copolymers according to this process.

The coumarin derivatives of formula III are usually commercially available or can be prepared according to known processes such as, for example, the Pechmann, the Perkin or the Knoevenagel reaction.

The coumarin units of general formula III, which are preferably linked in the 7-position with the corresponding molecular unit and the ethene group of which is not incorporated or is incorporated only to a small extent into the polymer, can be dimerized with linear polarized light after application of the polymer layer to a carrier. By the selective irradiation of the molecular units of formula III quite specific regions of a surface can now be directed and at the same time also stabilized by the dimerization.

Thus, for the production of polymer orienting layers in selectively defined surface regions, for example, firstly a solution of the polymer material obtained can be prepared and centrifuged in a spin-coating apparatus on to a carrier optionally coated with an electrode (e.g. a glass plate coated with indium-tin oxide (ITO)) so that homogeneous layers of 0.05–50 μm thickness result. Subsequently, the regions to be oriented can be irradiated e.g. with a mercury high pressure lamp, a xenon lamp or a pulsed UV laser using a polarizer and optionally a mask for the formation of structures. The irradiation period depends on the capacity of the individual lamps and can vary from a few minutes to several hours. The dimerization can, however, also be carried out by irradiating the homogeneous layer using filters, which e.g. let through only the radiation suitable for the cross-linking reaction.

The polymers in accordance with the invention are illustrated in more detail by the following Examples. In the Examples hereinafter $T_g$ signifies the glass temperature, $\Delta c p$ signifies the change in the specific heat capacity at constant pressure, log $I_o/I$ signifies the extinction, ε signifies the molar decadic absorption coefficient, C signifies a crystalline phase, G signifies a glassy solidified phase, LC signifies a liquid crystalline phase, N signifies the nematic phase and I signifies the isotropic phase.

EXAMPLE 1

Poly [1-methyl-1-(2-oxo-2H-1-benzopyran-7-yloxycarbonyl)-ethylene

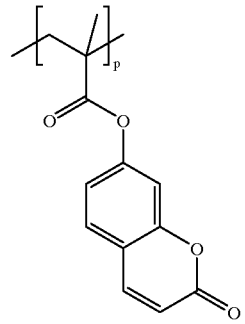

15 g (65.2 mmol) of 2-oxo-2H-1-benzopyran-7-yl 2-methyl-acrylate and 0.107 g (0.7 mmol) of 2,2'-azo-bisisobutyronitrile (AIBN) were dissolved in 130 ml of N,N-dimethylformamide (DMF). A weak stream of argon was passed through the solution for 15 minutes. Subsequently, the reaction vessel was closed airtight and heated to 55° C. After 12 hours the vessel was opened, the solution was diluted with 80 ml of DMF and added dropwise to 5 l of acetone while stirring vigorously at room temperature. The precipitated polymer was filtered off and dried at 60° C. in a water-jet vacuum. For further purification, the polymer was dissolved in 200 ml of DMF and again precipitated in 5 ml of acetone. This procedure was repeated until monomer was no longer detectable by thin-layer chromatography. Filtration and drying at 60° C. in a vacuum gave 11.4 g of poly [1-methyl-1-(2-oxo-2H-1-benzopyran-7-yloxycarbonyl)-ethylene] as a white powder with a glass stage of $T_g=184°$ C. ($\Delta c_p=0.33$ J/gK). $\lambda_{max.}$ (in $CH_2Cl_2$)=308.8 nm (ε=8130 l/mol cm) and 276.1 nm (ε=10270 l/mol cm).

The 2-oxo-2H-1-benzopyran-7-yl 2-methyl-acrylate used as the starting material was prepared according to the following procedure:

2-Oxo-2H-1-benzopyran-7-yl 2-methyl-acrylate

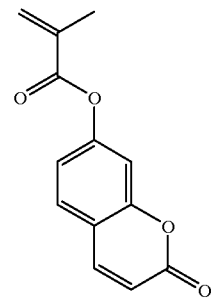

40 g (247 mmol) of 7-hydroxy-coumarin (umbelliferone) were suspended in 700 ml of tetrahydrofuran and treated in succession with 38 ml (271 mmol) of triethylamine and 0.603 g (5 mmol) of 4-dimethylaminopyridine (DMAP). 28.4 g (271 mmol) of methacryloyl chloride were added dropwise to the suspension, cooled to about 15° C., in the course of 30 minutes. The reaction batch was stirred at room temperature for 4 hours and subsequently filtered over a thin silica gel layer. The silica gel layer was rinsed thoroughly with THF. After evaporation of the solvent the crude product was dissolved in about 300 ml of dichloromethane and treated with 1.5 l of ethanol. The dichloromethane was again removed on a rotary evaporator. The product crystallized from the remaining ethanolic solution overnight in a refrigerator. It was filtered off, dried and recrystallized once again from 1.1 l of ethanol according to the described procedure. Filtration and drying at 40° C. in a water-jet vacuum gave 42.9 g of 2-oxo-2H-1-benzopyran-7-yl 2-methyl-acrylate as white crystals. $\lambda_{max.}$ (in $CH_2Cl_2$)=312.6 nm ($\epsilon$=9610 l/mol cm) and 282.3 nm ($\epsilon$=11450 l/mol cm).

The following polymers can by synthesized in an analogous manner:

poly [1-methyl-1-(4-methyl-2-oxo-2H-1-benzopyran-7-yloxycarbonyl)-ethylene], $T_g$=201° C.;

poly [1-methyl-1-(4-n-propyl-2-oxo-2H-1-benzopyran-7-yloxycarbonyl)-ethylene];

poly [1-methyl-1-(4-trifluoromethyl-2-oxo-2H-1-benzopyran-7-yloxycarbonyl)-ethylene];

poly [1-(3,4-dimethyl-2-oxo-2H-1-benzopyran-7-yloxycarbonyl)-1-methyl-ethylene];

poly [1-(4,8-dimethyl-2-oxo-2H-1-benzopyran-7-yloxycarbonyl)-1-methyl-ethylene];

poly [1-methyl-1-(4-phenyl-2-oxo-2H-1-benzopyran-7-yloxycarbonyl)-ethylene];

poly [1-(3-cyano-2-oxo-2H-1-benzopyran-7-yloxycarbonyl)-1-methyl-ethylene];

poly [1-(3-ethoxycarbonyl-2-oxo-2H-1-benzopyran-7-yloxycarbonyl)-1-methyl-ethylene];

poly [1-methyl-1-(2-oxo-1,2-dihydro-quinolin-7-yloxycarbonyl)-ethylene];

poly [1-methyl-1-(2-oxo-2H-1-benzopyran-7-ylcarbamoyl)-ethylene];

poly [1-methyl-1-(4-methyl-2-oxo-2H-1-benzopyran-7-ylcarbamoyl)-ethylene];

poly [1-(2-oxo-2H-1-benzopyran-7-yloxycarbonyl)-ethylene];

poly [1-(4-methyl-2-oxo-2H-1-benzopyran-7-yloxycarbonyl)-ethylene];

poly [1-(4-trifluoromethyl-2-oxo-2H-1-benzopyran-7-yloxycarbonyl)-ethylene];

poly [1-(4-phenyl-2-oxo-2H-1-benzopyran-7-yloxycarbonyl)-ethylene];

poly [1-(2-oxo-1,2-dihydro-quinolin-7-yloxycarbonyl)-ethylene];

poly [1-(2-oxo-2H-1-benzopyran-7-ylcarbamoyl)-ethylene];

poly [1-(4-methyl-2-oxo-2H-1-benzopyran-7-ylcarbamoyl)-ethylene];

poly [1-chloro-1-(2-oxo-2H-1-benzopyran-7-yloxycarbonyl)-ethylene];

poly [1-chloro-1-(4-methyl-2-oxo-2H-1-benzopyran-7-yloxycarbonyl)-ethylene];

poly [1-chloro-1-(2-oxo-2H-1-benzopyran-7-ylcarbamoyl)-ethylene];

poly [ 1-chloro-1-(4-methyl-2-oxo-2H-1-benzopyran-7-ylcarbamoyl)-ethylene].

EXAMPLE 2

Poly [1-methyl-1-[2-(2-oxo-2H-1-benzopyran-7-yloxy)-ethoxycarbonyl]-ethylene]

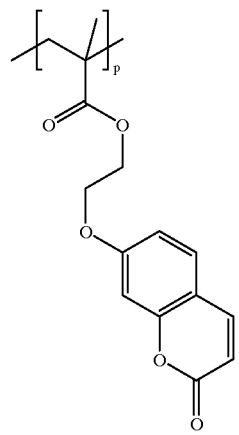

4 g (14.6 mmol) of 2-(2-oxo-2H-1-benzopyran-7-yloxy)-ethyl 2-methyl-acrylate and 0.024 g (0.15 mmol) of 2,2'-azo-bis-isobutyronitrile (AIBN) were dissolved in 29 ml of N,N-dimethylformamide. A weak stream of argon was passed through the solution for 15 minutes. Subsequently, the reaction vessel was closed airtight and heated to 55° C. After 5 hours the vessel was opened, the solution was diluted with 5 ml of DMF and added dropwise to about 1 l of acetone while stirring vigorously at room temperature. The precipitated polymer was filtered off and dried at 60° C. in a water-jet vacuum. For further purification, the polymer was dissolved in 30 ml of dichloromethane and precipitated in diethyl ether. This procedure was repeated until monomer was no longer detectable by thin-layer chromatography. Filtration and drying at 60° C. in a vacuum gave 2.6 g of poly [1-methyl-1-[2-(2-oxo-2H-1-benzopyran-7-yloxy)-ethoxycarbonyl]-ethylene] as white powder with a glass stage of $T_g$=115° C. ($\Delta c_p$=0.34 J/gK). $\lambda_{max.}$ (in $CH_2Cl_2$)= 317.6 nm ($\epsilon$=10780 l/mol cm).

The 2-(2-oxo-2H-1-benzopyran-7-yloxy)-ethyl 2-methylacrylate used as the starting material was prepared according to the following procedure:

2-(2-Oxo-2H-1-benzopyran-7-yloxy)-ethyl 2-methyl-acrylate

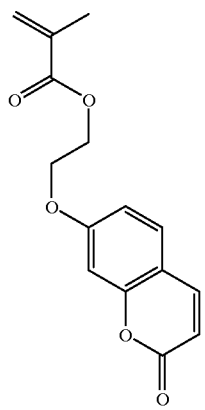

30 ml of a 38% solution of diethyl azodicarboxylate (DEAD) in toluene were added dropwise at room temperature while stirring within 30 minutes to a suspension of 8.83 g (67.8 mmol) of 2-hydroxyethyl methacrylate, 10 g (61.7 mmol) of 7-hydroxy-coumarin and 16.8 g (64 mmol) of triphenylphosphine in 300 ml of THF, care being taken that the reaction temperature did not exceed 25° C. The reaction mixture was subsequently stirred at room temperature for a further 3 hours and then concentrated on a rotary evaporator to about one sixth of its original volume. After adding about 200 ml of diethyl ether 2-(2-oxo-2H-1-benzopyran-7-yloxy)-ethyl 2-methyl-acrylate separated in analytically pure form. Yield: 14.7 g of white crystals, $\lambda_{max.}$ (in $CH_2Cl_2$)=320.8 nm ($\epsilon$=15060 l/mol cm).

The following polymers can be synthesized in an analogous manner:

Poly [1-methyl-1-[2-(4-methyl-2-oxo-2H-1-benzopyran-7-yloxy)-ethoxycarbonyl]-ethylene];

poly [1-methyl-1-[2-(4-trifluoromethyl-2-oxo-2H-1-benzopyran-7-yloxy)-ethoxycarbonyl]-ethylene];

poly [1-[2-(3,4-dimethyl-2-oxo-2H-1-benzopyran-7-yloxy)-ethoxycarbonyl]-1-methyl-ethylene];

poly [1-[2-(4,8-dimethyl-2-oxo-2H-1-benzopyran-7-yloxy)-ethoxycarbonyl]-1-methyl-ethylene];

poly [1-methyl-1-[2-(4-phenyl-2-oxo-2H-1-benzopyran-7-yloxy)-ethoxycarbonyl]-ethylene];

poly [1-[2-(3-cyano-2-oxo-2H-1-benzopyran-7-yloxy)-ethoxycarbonyl]-1-methyl-ethylene];

poly [1-[2-(3-ethoxycarbonyl-2-oxo-2H-1-benzopyran-7-yloxy)-ethoxycarbonyl]-1-methyl-ethylene], $T_g$=121° C.;

poly [1-methyl-1-[2-methyl-2-(2-oxo-2H-1-benzopyran-7-yloxy)-ethoxycarbonyl]-ethylene];

poly [1-methyl-1-[2-methyl-2-(4-methyl-2-oxo-2H-1-benzopyran-7-yloxy)-ethoxycarbonyl]-ethylene];

poly [1-methyl-1-[3-(2-oxo-2H-1-benzopyran-7-yloxy)-propoxycarbonyl]-ethylene];

poly [1-methyl-1-[3-(4-methyl-2-oxo-2H-1-benzopyran-7-yloxy)-propoxycarbonyl]-ethylene];

poly [1-methyl-1-[4-(2-oxo-2H-1-benzopyran-7-yloxy)-butoxycarbonyl]-ethylene];

poly [1-methyl-1-[4-(4-methyl-2-oxo-2H-1-benzopyran-7-yloxy)-butoxycarbonyl]-ethylene];

poly [1-methyl-1-[2-methyl-2-(2-oxo-2H-1-benzopyran-7-yloxy)-ethylcarbamoyl]-ethylene];

poly [1-methyl-1-[2-methyl-2-(4-methyl-2-oxo-2H-1-benzopyran-7-yloxy)-ethylcarbamoyl]-ethylene];

poly [1-methyl-1-[3-(2-oxo-2H-1-benzopyran-7-yloxy)-propylcarbamoyl]-ethylene];

poly [1-methyl-1-[3-(4-methyl-2-oxo-2H-1-benzopyran-7-yloxy)-propylcarbamoyl]-ethylene];

poly [1-[2-(2-oxo-2H-1-benzopyran-7-yloxy)-ethoxycarbonyl]-ethylene];

poly [1-[2-(4-methyl-2-oxo-2H-1-benzopyran-7-yloxy)-ethoxycarbonyl]-ethylene];

poly [1-[2-(4-trifluoromethyl-2-oxo-2H-1-benzopyran-7-yloxy)-ethoxycarbonyl]-ethylene];

poly [1-[2-(3,4-dimethyl-2-oxo-2H-1-benzopyran-7-yloxy)-ethoxycarbonyl]-ethylene];

poly [1-[2-(4,8-dimethyl-2-oxo-2H-1-benzopyran-7-yloxy)-ethoxycarbonyl]-ethylene];

poly [1-[2-(4-phenyl-2-oxo-2H-1-benzopyran-7-yloxy)-ethoxycarbonyl]-ethylene];

poly [1-[2-(3-cyano-2-oxo-2H-1-benzopyran-7-yloxy)-ethoxycarbonyl]-ethylene];

poly [1-[2-methyl-2-(2-oxo-2H-1-benzopyran-7-yloxy)-ethoxycarbonyl]-ethylene];

poly [1-[2-methyl-2-(4-methyl-2-oxo-2H-1-benzopyran-7-yloxy)-ethoxycarbonyl]-ethylene];

poly [1-[4-(2-oxo-2H-1-benzopyran-7-yloxy)-butoxycarbonyl]-ethylene];

poly [1-[4-(4-methyl-2-oxo-2H-1-benzopyran-7-yloxy)-butoxycarbonyl]-ethylene].

EXAMPLE 3

Poly [1-methyl-1-[2-(2-oxo-2H-1-benzopyran-7-yloxy)-ethoxycarbonyl]-ethylene]

by polymer-like etherification according to Mitsunobu

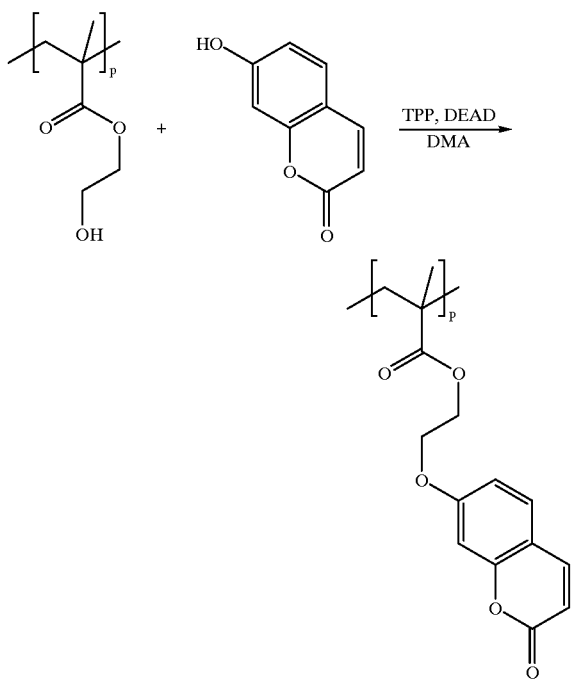

5 g (8.1 mmol) of a stock solution of poly (2-hydroxyethyl methacrylate) (21 wt. % in DMA) were diluted with 15 ml of dimethylacetamide (DMA). 2.11 g (8.1 mmol) of triphenylphosphine and 1.31 g (8.1 mmol) of 7-hydroxy-coumarin were dissolved in the reaction batch while stirring at room temper- ature. The solution was cooled to OOC. 1.25 ml (8.1 mmol) of diethyl azodicarboxylate (DEAD) were added dropwise within 10 minutes. The reaction batch was left at 0° C. for a further 15 minutes and then, after removal of the ice bath, stirred at room temperature for 15 hours prior to the addition of an equimolar amount of triphenylphosphine and of 7-hydroxy-coumarin. Subsequently, a further 1.25 ml of DEAD were added dropwise within 10 minutes. The reaction mixture was stirred at room temperature for a further 24 hours then added dropwise to about 900 ml of diethyl ether while stirring vigorously. The precipitated polymer was filtered off and dried at 60° C. in a water-jet vacuum. For purification, the residue was dissolved in 20 ml of dichloromethane and again precipitated in diethyl ether. This procedure was repeated until monomer was no longer detectable by thin-layer chromatography. Filtration and drying at 60° C. in a vacuum gave 1.77 g of poly [1-methyl-1-[2-(2-oxo-2H-1-benzopyran- 7-yloxy)-ethoxycarbonyl-ethylene] as a white powder with a glass stage of $T_g=115°$ C. ($\Delta c_p=0.35$ J/gK). $\lambda_{max}$ (in $CH_2Cl_2$)=317.8 nm ($\epsilon$=10830 l/mol cm).

The following polymers can be synthesized in an analogous manner:

poly [1-[2-(4-methyl-2-oxo-2H-1-benzopyran-6-yloxy)-ethoxycarbonyl]-1-methyl-ethylene-co-1-[2-hydroxyethoxycarbonyl]-1-methyl-ethylene], $T_g=120°$ C.;

poly [1-methyl-1-[2-(4-methyl-2-oxo-2H-1-benzopyran-7-yloxy)-ethoxycarbonyl]-ethylene], $T_g=131°$ C.;

poly [1-[2-(4-ethyl-2-oxo-2H-1-benzopyran-7-yloxy)-ethoxycarbonyl]-1-methyl-ethylene], $T_g=131°$ C.;

poly [1-methyl-1-[2-(4-n-propyl-2-oxo-2H-1-benzopyran-7-yloxy)-ethoxycarbonyl]-ethylene];

poly [1-methyl-1-[2-(4-trifluoromethyl-2-oxo-2H-1-benzopyran-7-yloxy)-ethoxycarbonyl]-ethylene], $T_g=120°$ C.;

poly [1-[2-(3,4-dimethyl-2-oxo-2H-1-benzopyran-7-yloxy)-ethoxycarbonyl]-1-methyl-ethylene];

poly [1-[2-(4,8-dimethyl-2-oxo-2H-1-benzopyran-7-yloxy)-ethoxycarbonyl]-1-methyl-ethylene];

poly [1-[2-(3-chloro-4-methyl-2-oxo-2H-1-benzopyran-7-yloxy)-ethoxycarbonyl]-1-methyl-ethylene], $T_g=142°$ C.;

poly [1-methyl-1-[2-(4-methyl-8-nitro-2-oxo-2H-1-benzopyran-7-yloxy)-ethoxycarbonyl]-ethylene], $T_g=176°$ C.;

poly [1-methyl-1-[2-(3,4,8-trimethyl-2-oxo-2H-1-benzopyran-7-yloxy)-ethoxycarbonyl]-ethylene], $T_g=158°$ C.;

poly [1-methyl-1-[2-(4-phenyl-2-oxo-2H-1-benzopyran-7-yloxy)-ethoxycarbonyl]-ethylene];. poly [1-[2-(3-cyano-2-oxo-2H-1-benzopyran-7-yloxy)-ethoxycarbonyl]-1-methyl-ethylene];

poly [1-methyl-1-[2-methyl-2-(2-oxo-2H-1-benzopyran-7-yloxy)-ethoxycarbonyl]-ethylene];

poly [1-methyl-1-[2-methyl-2-(4-methyl-2-oxo-2H-1-benzopyran-7-yloxy)-ethoxycarbonyl]-ethylene];

poly [1-methyl-1-[2-(2-oxo-2H-1-benzopyran-7-yloxy)-ethoxycarbonyl]-ethylene-co-1-(2-hydroxy-ethoxycarbonyl)-1-methyl-ethylene];

poly [1-methyl-1-[2-(4-methyl-2-oxo-2H-1-benzopyran-7-yloxy)-ethoxycarbonyl]-ethylene-co-1-(2-hydroxy-ethoxycarbonyl)-1-methyl-ethylene];

poly [1-methyl-1-[2-(4-n-propyl-2-oxo-2H-1-benzopyran-7-yloxy)-ethoxycarbonyl]-ethylene-co-1-(2-hydroxy-ethoxycarbonyl)-1-methyl-ethylene] (9:1), $T_g=110°$ C.;

poly [1-methyl-1-[2-(4-trifluoromethyl-2-oxo-2H-1-benzopyran-7-yloxy)-ethoxycarbonyl]-ethylene-co-1-(2-hydroxy-ethoxycarbonyl)-1-methyl-ethylene] (4:1), $T_g=120°$ C.;

poly [1-[2-(3,4-dimethyl-2-oxo-2H-1-benzopyran-7-yloxy)-ethoxycarbonyl]-1-methyl-ethylene-co-1-(2-hydroxy- ethoxycarbonyl)-1-methyl-ethylene], $T_g=146°$ C.;

poly [1-[2-(4,8-dimethyl-2-oxo-2H-1-benzopyran-7-yloxy)-ethoxycarbonyl]-1-methyl-ethylene-co-1-(2-hydroxy-ethoxycarbonyl)-1-methyl-ethylene];

poly [1-methyl-1-[2-(4-phenyl-2-oxo-2H-1-benzopyran-7-yloxy)-ethoxycarbonyl]-ethylene-co-1-(2-hydroxy-ethoxycarbonyl)-1-methyl-ethylene];

poly [1-[2-(3-cyano-2-oxo-2H-1-benzopyran-7-yloxy)-ethoxycarbonyl]-1-methyl-ethylene-co-1-(2-hydroxy-ethoxycarbonyl)-1-methyl-ethylene];

poly [[1-methyl-1-[2-(2-oxo-1,2-dihydro-quinolin-7-yloxy)-ethoxycarbonyl]-ethylene-co-1-(2-hydroxy-ethoxycarbonyl)-1-methyl-ethylene], $T_g=185°$ C.

EXAMPLE 4

Poly [1-methyl-1-[4-(2-oxo-2H-1-benzopyran-7-yloxy)-piperidin-1-ylcarbonyl]-ethylene

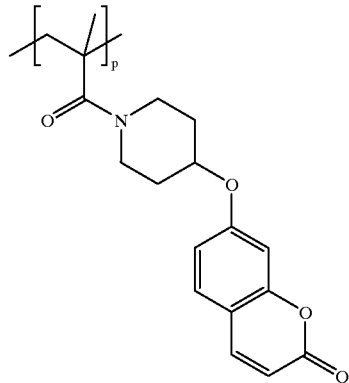

2 g (6.4 mmol) of 7-[1-(2-methyl-acryloyl)-piperidin-4-yloxy]-2-oxo-2H-1-benzopyran and 10.5 mg (0.06 mmol) of 2,2'-azo-bis-isobutyronitrile were dissolved in 13 ml of N,N-dimethylformamide (DMF). A weak stream of argon was passed through the solution for 15 minutes. Subsequently, the reaction vessel was closed airtight and heated to 60° C. After 48 hours the vessel was opened, the solution was diluted with about 10 ml of DMF and added dropwise to 900 ml of methanol while stirring vigorously at room temperature. The precipitated polymer was filtered off and dried at 40° C. in a water-jet vacuum. For further purification, the polymer was dissolved in about 20 ml of DMF and again precipitated in 900 ml of methanol. This procedure was repeated until monomer was no longer detectable by thin-layer chromatography. Filtration and drying at 400C in a water- jet vacuum gave 1.56 g of poly [1-methyl-1-[4-(2-oxo-2H-1-benzopyran-7-yloxy)-piperidin-1-ylcarbonyl]-ethylene]. $\lambda_{max}$ (in $CH_2Cl_2$)=319 nm.

The 7-[1-(2-methyl-acryloyl)-piperidin-4-yloxy]-2-oxo-2H-1-benzopyran used as the starting material was prepared according to the following procedure:

1-(4-Hydroxy-piperidin-1-yl)-2-methyl-prop-2-en-1-one

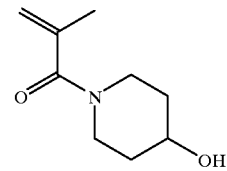

11 g (109 mmol) of 4-hydroxy-piperidine and 14.5 ml of triethylamine were dissolved in a mixture of 30 ml of THF and 80 ml of dichloromethane and cooled to 0° C. 10 ml (104 mmol) of methacryloyl chloride were added dropwise within 15 minutes. The solution was stirred at 10° C. for 5 hours. Subsequently, the reaction mixture was filtered over silica gel. After distillation of the solvent the crude product was purified by column chromatography on silica gel with ethyl acetate as the eluent. Therefrom there resulted 14.5 g of 1-(4-hydroxy-piperidin-1-yl)-2-methyl-prop-2-en-1-one in the form of white crystals.

IR (KBr): 1605 cm$^{-1}$ (broad, C=O), 1078 cm$^{-1}$ (CH—OH), 909 cm$^{-1}$ (C=CH$_2$).

7-[1-(2-Methyl-acryloyl)-piperidin-4-yloxyl]-2-oxo-2H-1-benzopyran

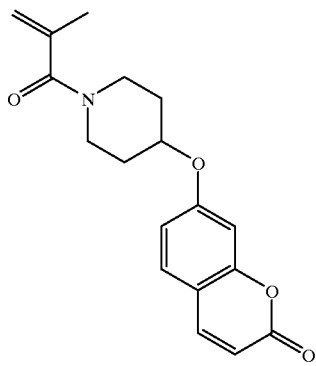

19 ml of a 38% solution of diethyl azodicarboxylate (DEAD) in toluene were added dropwise at room temperature while stirring within 15 minutes to a suspension of 7.1 g (42 mmol) of 1-(4-hydroxy-piperidin-1-yl)-2-methyl-prop-2-en-1-one, 6.8 g (42 mmol) of 7-hydroxy-coumarin and 11 g (42 mmol) of triphenylphosphine in 250 ml of THF. The reaction mixture was stirred at room temperature for 24 hours and then concentrated on a rotary evaporator, taken up in diethyl ether and filtered. The filtrate was evaporated completely and the residue was chromatographed twice on silica gel. Finally, the product was recrystallized once from cyclohexane. 3 g of 7-[1-(2-methyl-acryloyl)-piperidin-4-yloxy]-2-oxo-2H-1-benzopyran remained as white crystals. $\lambda_{max.}$ (in CH$_2$Cl$_2$)=322 nm ($\epsilon$=16390 l/mol cm)

The following polymers can be synthesized in an analogous manner:

poly [1-methyl-1-[4-(4-methyl-2-oxo-2H-1-benzopyran-7-yloxy)-piperidin-1-ylcarbonyl]-ethylene];

poly [1-methyl-1-[4-(4-n-proyl-2-oxo-2H-1-benzopyran-7-yloxy)-piperidin-1-ylcarbonyl]-ethylene];

poly [1-methyl-1-[4-(4-trifluoromethyl-2-oxo-2H-1-benzopyran-7-yloxy)-piperidin-1-ylcarbonyl]-ethylene];

poly [1-[4-(3,4-dimethyl-2-oxo-2H-1-benzopyran-7-yloxy)-piperidin-1-ylcarbonyl]-1-methyl-ethylene];

poly [1-[4-(4,8-dimethyl-2-oxo-2H-1-benzopyran-7-yloxy)-piperidin-1-ylcarbonyl]-1-methyl-ethylene];

poly [1-methyl-1-[4-(4-phenyl-2-oxo-2H-1-benzopyran-7-yloxy)-piperidin-1-ylcarbonyl]-ethylene];

poly [1-[4-(3-cyano-2-oxo-2H-1-benzopyran-7-yloxy)-piperidin-1-ylcarbonyl]-1-methyl-ethylene];

poly [1-[4-(2-oxo-2H-1-benzopyran-7-yloxy)-piperidin-1-ylcarbonyl]-ethylene];

poly [1-[4-(4-methyl-2-oxo-2H-1-benzopyran-7-yloxy)-piperidin-1-ylcarbonyl]-ethylene];

poly [1-chloro-1-[4-(2-oxo-2H-1-benzopyran-7-yloxy)-piperidin-1-ylcarbonyl]-ethylene];

poly [1-chloro-1-[4-(4-methyl-2-oxo-2H-1-benzopyran-7-yloxy)-piperidin-1-ylcarbonyl]-ethylene].

EXAMPLE 5

Poly [1-methyl-1-[6-[4-(2-oxo-2H-1-benzopyran-7-yloxycarbonyl)-phenoxy]-hexyloxycarbonyl]-ethylene]

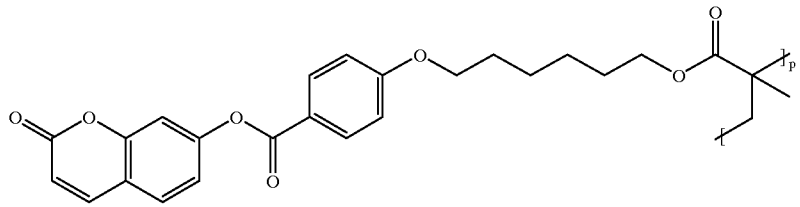

1 g (2.22 mmol) of 2-oxo-2H-1-benzopyran-7-yl 4-(6-(2-methyl-acryloyloxy)-hexyloxy]-benzoate and 1.85 mg (0.011 mmol) of 2,2'-azo-bis-isobutyronitrile were dissolved in 4.5 ml of N,N-dimethylformamide (DMF). A weak stream of argon was passed through the solution for 15 minutes. Subsequently, the reaction vessel was closed airtight and heated to 60° C. After 24 hours the vessel was opened, the solution was diluted with 8 ml of DMF and added dropwise to 300 ml of methanol at room temperature while stirring vigorously. The precipitated polymer was filtered off and dried at 40° C. in a water-jet vacuum. For further purification, the polymer was dissolved in about 10 ml of DMF and again precipitated in 200 ml of methanol. This procedure was repeated until monomer was no longer detectable by thin-layer chromatography. Filtration and drying at 40° C. in a water-jet vacuum gave 0.82 g of poly [1-methyl-1-[6-[4-(2-oxo-2H-1-benzopyran-7-yloxycarbonyl)-phenoxy]-hexyloxycarbonyl]-ethylene]. Phase succession (° C.): G 68 LC 90 I; $\lambda_{max.}$ (in CH$_2$Cl$_2$)= 307.8 nm ($\epsilon$=11150 l/mol cm) and 275.8 nm ($\epsilon$=23190 l/mol cm).

The oxo-2H-1-benzopyran-7-yl 4-[6-(2-methyl-acryloyloxy)-hexyloxy]-benzoate used as the starting material was prepared according to the following procedure:

4-(6-Hydroxy-hexyloxy)-benzoic acid

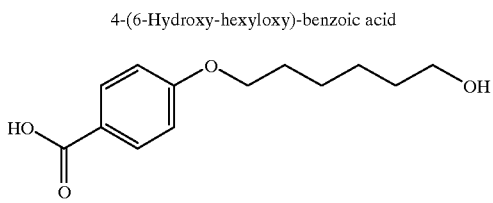

229.2 g (1.66 mol) of p-hydroxy-benzoic acid were dissolved in 600 ml of methanol and treated at 60° C. within 10 minutes with a solution of 151 g (3.77 mol) of NaOH in 480 ml of H$_2$O. 271.2 g (1.99 mol) of 6-chloro-hexanol were slowly added dropwise to this solution. Finally, 0.75 g of potassium iodide was added and the batch was boiled under reflux for 60 hours. For working-up, the yellow solution was poured into 3 l of H$_2$O and treated with 10% HCl (about 600 ml) until a pH value of 1 had been reached. The milky suspension was filtered over a large suction filter. The residue was sucked dry and recrystallized twice from about 1.5 l of ethanol. This gave 229.6 g of 4-(6-hydroxy-hexyloxy)-benzoic acid as a fine white powder; m.p. 136–141° C.

4-[6-(2-Methyl-acryloyloxy)-hexyloxy]-benzoic acid

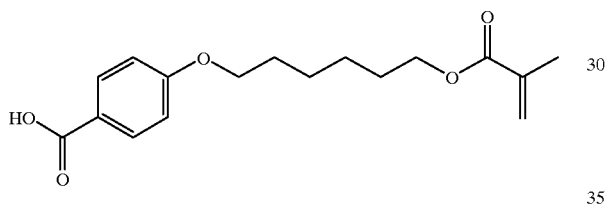

71.5 g (0.3 mol) of 4-(6-hydroxy-hexyloxy)-benzoic acid and 101.5 g (1.18 mol) of methacrylic acid were dissolved in 950 ml of chloroform. After the addition of 7.2 g (0.07 mol) of hydroquinone and 7.2 g (0.04 mol) of p-toluenesulphonic acid the batch was boiled under reflux on a water separator for 48 hours. The clear brown solution was subsequently evaporated, the residue was taken up in 1.5 l of diethyl ether, filtered and shaken five times with 300 ml of H$_2$O each time. The organic phase was dried over Na$_2$SO$_4$, evaporated and the residue was recrystallized twice from methanol. After drying at 40° C. in a water-jet vacuum 47.33 g of 4-[6-(2-methyl-acryloyloxy)-hexyloxy]-benzoic acid remained as a white powder; m.p. 83° C.

8.5 g (0.028 mol) of 4-[6-(2-methyl-acryloyloxy)-hexyloxy]-benzoic acid were treated with 10 ml of thionyl chloride and 3 drops of DMF and boiled under reflux for 4 hours. The excess thionyl chloride was removed completely, firstly in a water-jet vacuum and subsequently in a high vacuum. The acid chloride remaining was taken up in 20 ml of THF and slowly added dropwise at 0° C. to a suspension of 4.09 g (0.025 mol) of 7-hydroxy-coumarin and 4.25 ml of triethylamine in 30 ml of THF. The batch was stirred at room temperature overnight, filtered and the filtrate was evaporated to dryness. The residue was purified by column chromatography and subsequently by recrystallization from ethanol. 6.71 g of 2-oxo-2H-1-benzopyran-7-yl 4-[6-(2-methyl-acryloyloxy)-hexyloxy]-benzoate were isolated as a white powder; m.p. 98–104.5° C.

The following polymers can be synthesized in an analogous manner:

poly [1-methyl-1-[2-[4-(2-oxo-2H-1-benzopyran-7-yloxycarbonyl)-phenoxy]-ethoxycarbonyl]-ethylene];

poly [1-methyl-1-[3-[4-(2-oxo-2H-1-benzopyran-7-yloxycarbonyl)-phenoxy]-propoxycarbonyl]-ethylene];

poly [1-methyl-1-[4-[4-(2-oxo-2H-1-benzopyran-7-yloxycarbonyl)-phenoxy]-butoxycarbonyl]-ethylene];

poly [1-methyl-1-[5-[4-(2-oxo-2H-1-benzopyran-7-yloxycarbonyl)-phenoxy]-pentyloxycarbonyl]-ethylene];

poly [1-[2-[4-(2-oxo-2H-1-benzopyran-7-yloxycarbonyl)-phenoxy]-ethoxycarbonyl]-ethylene];

poly [1-[3-[4-(2-oxo-2H-1-benzopyran-7-yloxycarbonyl)-phenoxy]-propoxycarbonyl]-ethylene];

poly [1-[4-[4-(2-oxo-2H-1-benzopyran-7-yloxycarbonyl)-phenoxy]-butoxycarbonyl]-ethylene];

poly [1-[5-[4-(2-oxo-2H-1-benzopyran-7-yloxycarbonyl)-phenoxy]-pentyloxycarbonyl]-ethylene];

poly [1-[6-[4-(2-oxo-2H-1-benzopyran-7-yloxycarbonyl)-phenoxy]-hexyloxycarbonyl]-ethylene];

poly [1-methyl-1-[6-[4-(4-methyl-2-oxo-2H-1-benzopyran-7-yloxycarbonyl)-phenoxy]-hexyloxycarbonyl]-ethylene];

poly [1-methyl-1-[6-[4-(4-trifluoromethyl-2-oxo-2H-1-benzopyran-7-yloxycarbonyl)-phenoxy]-hexyloxycarbonyl]-ethylene];

poly [1-methyl-1-[6-[4-(3-cyano-2-oxo-2H-1-benzopyran-7-yloxycarbonyl)-phenoxy]-hexyloxycarbonyl]-ethylene].

2-Oxo-2H-1-benzopyran-7-yl 4-[6-(2-methyl-acryloyloxy)-hexyloxy]-benzoate

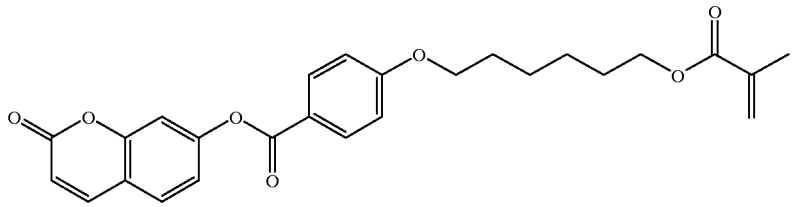

EXAMPLE 6

Poly [oxy-methyl-[4-[4-(2-oxo-2H-1-benzopyran-7-yloxycarbonyl)-phenoxy]-butyl]-silylene]

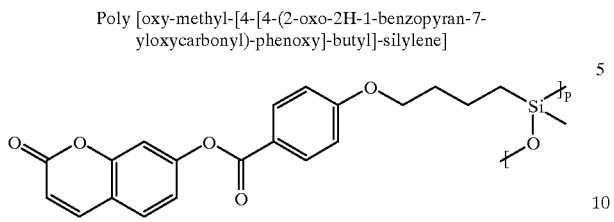

2-Oxo-2H-1-benzopyran-7-yl 4-(but-3-enyloxy)-benzoate

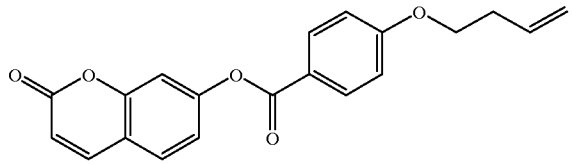

0.852 g (2.5 mmol) of 2-oxo-2H-1-benzopyran-7-yl 4-(but-3-enyloxy)-benzoate and 0.127 g of poly(methyl-hydrogen-siloxane) were dissolved in 15 ml of dichloromethane. The solution was flushed over a septum on the reaction vessel for 10 minutes with a weak stream of nitrogen. Subsequently, 8 rl of a platinum-divinyltetramethyldisiloxane complex solution was sprayed into the reaction mixture at room temperature while stirring. The batch was stirred at room temperature for one week. Subsequently, the reaction mixture was added dropwise to 400 ml of ice-cooled methanol while stirring. The precipitated polymer was separated, dried, dissolved in about 10 ml of dichloromethane and precipitated in 300 ml of diethyl ether. This procedure was repeated a further twice. After drying in a high vacuum this gave 0.15 g of poly [oxy-methyl-[4-[4-(2-oxo-2H-1-benzopyran-7-yloxycarbonyl)-phenoxy]-butyl]-silylene] with a glass stage $T_g$=54° C., $\Delta c_p$=0.19 J/gK.

The 2-oxo-2H-1-benzopyran-7-yl 4-(but-3-enyloxy)-benzoate used as the starting material was prepared according to the following procedure:

4-(But-3-enyloxy)-benzoic acid

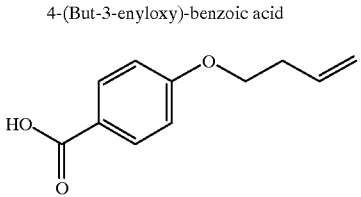

69.1 g (0.5 mol) of p-hydroxybenzoic acid were dissolved in 400 ml of ethanol and treated with a solution of 56.1 g (1 mol) of KOH in 250 ml of water. The reaction batch was heated under reflux. In so doing, 74.26 g (0.55 mol) of 4-bromo-1-butene were slowly added dropwise. After 5 hours the ethanol was removed on a rotary evaporator. The aqueous phase was brought to a pH value of 10 with NaOH and extracted several times with diethyl ether. The aqueous phase was poured into a mixture of 46 ml of concentrated HCl and 500 ml of ice-water. The precipitated acid was filtered off, washed with a small amount of water and recrystallized from methanol/water (mixture ratio 2/1 ). After drying at 60° C. in a water-jet vacuum there remained 40 g of 4-(but-3-enyloxy)-benzoic acid as a white powder; m.p. (C-N) 120° C., cl.p. (N-l) 141° C.

4.85 g (0.025 mol of 4-(but-3-enyloxy)-benzoic acid were treated with 9 ml of thionyl chloride and 2 drops of DMF and boiled under reflux for 2 hours. The excess thionyl chloride was removed completely, firstly in a water-jet vacuum and subsequently in a high vacuum. The acid chloride remaining was taken up in 10 ml of dichloromethane and slowly added dropwise at 0° C. to a suspension of 3.9 g (0.024 mol) of 7-hydroxy-coumarin and 3.9 ml of triethylamine in 5 ml of dichloromethane. The batch was stirred at room temperature overnight, filtered and the filtrate was evaporated. For purification, the residue was chromatographed on silica gel wiith dichloromethane and subsequently recrystallized from ethanol. There were isolated 5.2 g of 2-oxo-2H-1-benzopyran-7-yl 4-(but-3-enyloxy)-benzoate in the form of fine white needles; m.p. 108–109° C.

The following polymers can be synthesized in an analogous manner:

poly [oxy-methyl-[4-[4-(4-methyl-2-oxo-2H-1-benzopyran-7-yloxycarbonyl)-phenoxy]-butyl]-silylene];

poly [oxy-methyl-[4-[4-(4-trifluoromethyl-2-oxo-2H-1-benzopyran-7-yloxycarbonyl)-phenoxy]-butyl]-silylene];

poly [oxy-methyl-[4-[4-(3,4-dimethyl-2-oxo-2H-1-benzopyran-7-yloxycarbonyl)-phenoxy]-butyl]-silylene];

poly [oxy-methyl-[4-[4-(4,8-dimethyl-2-oxo-2H-1-benzopyran-7-yloxycarbonyl)-phenoxy]-butyl]-silylene];

poly [oxy-methyl-[3-[4-(2-oxo-2H-1-benzopyran-7-yloxycarbonyl)-phenoxy]-propyl]-silylene];

poly [oxy-methyl-[5-[4-(2-oxo-2H-1-benzopyran-7-yloxycarbonyl)-phenoxy]-pentyl]-silylene];

poly [oxy-methyl-[6-[4-(2-oxo-2H-1-benzopyran-7-yloxycarbonyl)-phenoxy]-hexyl]-silylene];

poly [oxy-methyl-[4-[4-(2-oxo-2H-1-benzopyran-7-yloxycarbonyl)-phenoxy]-butyl]-silylene-co-oxy-dimethyl-silylene];

poly [oxy-methyl-[6-[4-(2-oxo-2H-1-benzopyran-7-yloxycarbonyl)-phenoxy]-hexyl]-silylene-co-oxy-dimethyl-silylene].

EXAMPLE 7

Poly [1-methoxycarbonyl-1-methyl-ethylene-co-1-methyl-1-(2-oxo-2H-1-benzopyran-7-yloxycarbonyl)-ethylene] (1:12)

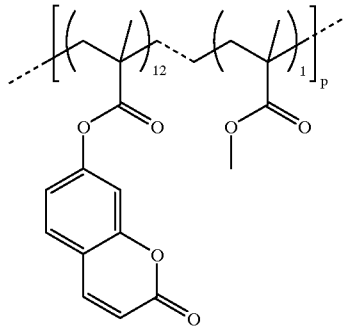

2 g (8.7 mmol) of 2-oxo-2H-1-benzopyran-7-yl 2-methyl-acrylate, 0.15 g (1.5 mmol) of 2-methyl-acrylic acid and 16.8 mg (0.102 mmol) of 2,2'-azo-bis-isobutyronitrile were dissolved in 20 ml of N,N-dimethylformamide (DMF). A weak stream of argon was passed through the solution for 30 minutes. Subsequently, the reaction vessel was closed airtight and heated to 55° C. After 6 hours the vessel was opened and the solution was added dropwise to 800 ml of diethyl ether at room temperature while stirring vigorously. The precipitated polymer was filtered off and dried at 70° C. in a water-jet vacuum. For further purification, the polymer was dissolved in 20 ml of dichloromethane and again precipitated in 800 ml of diethyl ether. This procedure was repeated until monomer was no longer detectable by thin-layer chromatography. Filtration and drying at 60° C. in a water-jet vacuum gave 1.27 g of poly [1-methoxycarbonyl-1-methyl-ethylene-co-1-methyl-1-(2-oxo-2H-1-benzopyran-7-yloxycarbonyl)-ethylene] (1:12). The polymer has a glass stage at $T_g$=182° C. $\lambda_{max.}$ (7.51 mg/l in $CH_2Cl_2$)=308 nm (log $1_o/1$=0.259) and 275.6 nm (log IJI =0.327).

The preparation of the 2-oxo-2H-1-benzopyran-7-yl 2-methyl-acrylate is described in Example 1.

The following polymers can be synthesized in an analogous manner:

poly [1-(2-hydroxy-ethoxycarbonyl)-1-methyl-ethylene-co-1-methyl-1-(2-oxo-2H-1-benzopyran-7-yloxycarbonyl)-ethylene] (1:9), $T_g$=181° C.;

poly [1-(2-hydroxy-ethoxycarbonyl)-ethylene-co-1-methyl-1-(2-oxo-2H-1-benzopyran-7-yloxycarbonyl)-ethylene];

poly [1-cyano-1-methyl-ethylene-co-1-methyl-1-(2-oxo-2H-1-benzopyran-7-yloxycarbonyl)-ethylene];

poly [1-cyano-ethylene-co-1-methyl-1-(2-oxo-2H-1-benzopyran-7-yloxycarbonyl)-ethylene];

poly [1-methoxycarbonyl-ethylene-co-1-methyl-1-(2-oxo-2H-1-benzopyran-7-yloxycarbonyl)-ethylene];

poly [1-methoxycarbonyl-1-methyl-ethylene-co-1-(2-oxo-2H-1-benzopyran-7-yloxycarbonyl)-ethylene];

poly [1-methyl-1-(2-oxo-2H-1-benzopyran-7-yloxycarbonyl)-ethylene-co-1-phenyl-ethylene];

poly [1-methoxycarbonyl-1-methyl-ethylene-co-1-methyl-1-[2-(2-oxo-2H-1-benzopyran-7-yloxy)-ethoxycarbonyl]-ethylene];

poly [1-methoxycarbonyl-1-methyl-ethylene-co-1-methyl-1-[4-(2-oxo-2H-1-benzopyran-7-yloxy)-butoxycarbonyl]-ethylene];

poly [1-methoxycarbonyl-1-methyl-ethylene-co-1-methyl-1-[6-(2-oxo-2H-1-benzopyran-7-yloxy)-hexyloxycarbonyl]-ethylene];

poly [1-methoxycarbonyl-1-methyl-ethylene-co-1-methyl-1-(4-methyl-Z-oxo-2H-1-benzopyran-7-yloxycarbonyl)-ethylene];

poly [1-cyano-1-methyl-ethylene-co-1-methyl-1-(4-methyl-2-oxo-2H-1-benzopyran-7-yloxycarbonyl)-ethylene];

poly [1-methoxycarbonyl-1-methyl-ethylene-co-1-methyl-1-[2-(4-methyl-2-oxo-2H-1-benzopyran-7-yloxy)-ethoxycarbonyl]-ethylene];

poly [1-cyano-1-methyl-ethylene-co-1-methyl-1-[2-(4-methyl-2-oxo-2H-1-benzopyran-7-yloxy)-ethoxycarbonyl]-ethylene];

poly [1-cyano-ethylene-co-1-methyl-1-[2-(4-phenyl-2-oxo-2H-1-benzopyran-7-yloxy)-ethoxycarbonyl]-ethylene];

poly [1-methyl-1-[2-(4-methyl-2-oxo-2H-1-benzopyran-7-yloxy)-ethoxycarbonyl]-ethylene-co-1-phenyl-ethylene];

poly [1-methoxycarbonyl-1-methyl-ethylene-co-1-methyl-1-[ 2-[4-(2-oxo-2H-1-benzopyran-7-yloxycarbonyl)-phenoxy]-ethoxycarbonyl]-ethylene];

poly [1-methoxycarbonyl-1-methyl-ethylene-co-1-methyl-1-[6-[4-(2-oxo-2H-1-benzopyran-7-yloxycarbonyl)-phenoxy]-hexyloxycarbonyl]-ethylene];

poly [1-methoxycarbonyl-1-methyl-ethylene-co-1-methyl-1-[ 6-[4-(3-cyano-2-oxo-2H-1-benzopyran-7-yloxycarbonyl)-phenoxy]-hexyloxycarbonyl]-ethylene];

poly [1-cyano-1-methyl-ethylene-co-1-methyl-1-[6-[4-(2-oxo-2H-1-benzopyran-7-yloxycarbonyl)-phenoxy]-hexyloxycarbonyl]-ethylene];

poly [1-cyano-ethylene-co-1-methyl-1-[6-[4-(2-oxo-2H-1 -benzopyran-7-yloxycarbonyl)-phenoxy]-hexyloxycarbonyl]- ethylene];

poly [1-methyl-1-[6-[4-(2-oxo-2H-1-benzopyran-7-yloxy- carbonyl)-phenoxy]-hexyloxycarbonyl]-ethylene-co-1-phenyl-ethylene];

poly [1-methoxycarbonyl-1-methyl-ethylene-co-1-methyl-1-[4-(2-oxo-2H-1-benzopyran-7-yloxy)-piperidin-1-ylcarbonyl]-ethylene];

poly [1-cyano-ethylene-co-1-methyl-1-[4-(2-oxo-2H-1 -benzopyran-7-yloxy)-piperidin-1-ylcarbonyl]-ethylene];

poly [1-methyl-1-[4-(2-oxo-2H-1-benzopyran-7-yloxy)-piperidin-1-ylcarbonyl]-ethylene-co-1-phenyl-ethylene].

EXAMPLE 8

Poly [1-[6-[4-(4-methoxy-phenoxycarbonyl)-phenoxy]-hexyloxycarbonyl]-1-methyl-ethylene-co-1-methyl-1-[6-[4-(2-oxo-2H-1-benzopyran-7-yloxycarbonyl)-phenoxy]-hexyloxycarbonyl]-ethylene] (1:1)

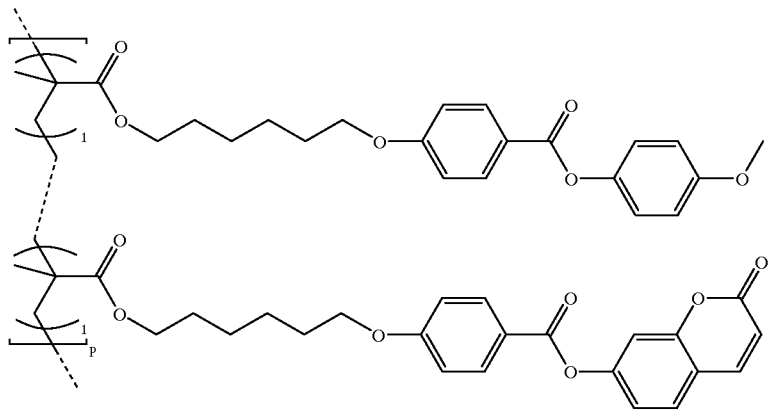

0.5 g (1.11 mmol) of 2-oxo-2H-1-benzopyran-7-yl 4-[6-(2-methyl-acryloyloxy)-hexyloxy]-benzoate, 0.46 g (1.11 mmol) of 4-methoxy-phenyl 4-[6-(2-methyl-acryloyloxy)-hexyloxy]-benzoate and 3.62 mg (0.022 mmol) of 2,2'-azo-bis-isobutyronitrile were dissolved in 4.5 ml of N,N-dimethylformamide (DMF). A weak stream of argon was passed through the solution for 30 minutes. Subsequently, the reaction vessel was closed airtight and heated to 55° C. After 20 hours the vessel was opened, the solution was diluted with 4 ml of DMF and added dropwise to 450 ml of methanol at room temperature while stirring vigorously. The precipitated polymer was filtered off and dried at 40° C. in a water-jet vacuum. For further purification, the polymer was dissolved in about 20 ml of dichloromethane and again precipitated in 700 ml of methanol. This procedure was repeated until monomer was no longer detectable by thin-layer chromatography. Filtration and drying at 40° C. in a water-jet vacuum gave 0.85 g of poly [1-[6-[4-(4-methoxy-phenyl-oxycarbonyl)-phenoxy]-hexyloxycarbonyl]-1-methyl-ethylene-co-1-methyl-1-[6-[4-(2-oxo-2H-1-benzopyran-7-yloxycarbonyl)-phenoxy]-hexyloxycarbonyl]-ethylene] (1:1). Phase succession (° C.): G 56 LC 96 I, $\lambda_{max.}$ (14.95 mg/l in $CH_2Cl_2$) =308 nm (log $I_o/I$=0.213) and 267.4 nm (log $I_o/I$=0.754).

The preparation of the 2-oxo-2H-1-benzopyran-7-yl 4-[6-(2-methyl-acryloyloxy)-hexyloxy]-benzoate is described in Example 5.

The 4-methoxy-phenyl 4-[6-(2-methyl-acryloyloxy)-hexyloxy]-benzoate ester was prepared starting from 4-[6-(2-methyl-acryloyloxy)-hexyloxy]-benzoic acid (Example 5) and 4-methoxy-phenol according to the following procedure:

4-Methoxy-phenyl 4-[6-(2-methyl-acryloyloxy)-hexyloxy]-benzoate

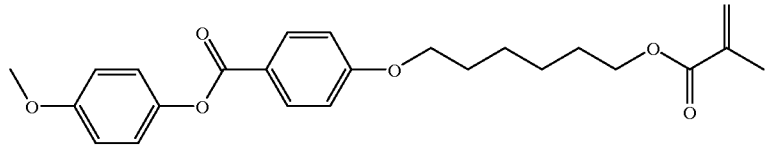

6.8 g (33 mmol) of N,N'-dicyclohexylcarbodiimide were added at 0° C. while stirring to a solution of 7.8 g (25.4 mmol) of 4-[6-(2-methyl-acryloyloxy)-hexyloxy]-benzoic acid, 2.9 g (23.4 mmol) of 4-methoxy-phenol and 0.5 g of 4-(dimethyl-amino)-pyridine in 200 ml of dichloromethane. The reaction mixture was stirred at room temperature for a further 16 hours, then filtered and the filtrate was extracted twice with saturated $K_2CO_3$ solution. The combined organic phases were washed twice with saturated sodium chloride solution, dried over magnesium sulphate, filtered and subsequently concentrated. Chromatographic purification of the residue on silica gel with methylene chloride: acetone=19:1 and two-fold recrystallization of the fractions which were pure according to thin-layer chromatography from methyl alcohol gave 7.76 g of 4-methoxy-phenyl 4-[6-(2-methyl-acryloyloxy)-hexyloxy]-benzoate as a white solid. The substance is monotropic nematic, m.p. (C-l) 550C, (cl.p. (N-l) 35.7° C.). Mass spectrometric analysis yields the mol peak at m/e=412.

The following polymers can be synthesized in an analogous manner:

poly [1-[6-[4-(4-methoxy-phenoxycarbonyl)-phenoxy]-hexyloxycarbonyl]-1-methyl-ethylene-co-1-methyl-1-[6-[4-(4-methyl-2-oxo-2H-1-benzopyran-7-yloxycarbonyl)-phenoxy]-hexyloxycarbonyl]-ethylene];

poly [1-[6-[4-(4-methoxy-phenoxycarbonyl)-phenoxy]-hexyloxycarbonyl]-1-methyl-ethylene-co-1-[ 6-[4-(3-cyano-2-oxo-2H-1-benzopyran-7-yloxycarbonyl)-phenoxy]-hexyloxy-carbonyl]-1-methyl-ethylene];

poly [1-[6-[4-(4-methoxy-phenoxycarbonyl)-phenoxy]-hexyloxycarbonyl]-1-methyl-ethylene-co-1-methyl-1-[6-[4-(4-trifluoromethyl-2-oxo-2H-1-benzopyran-7-yloxycarbonyl)-phenoxy]-hexyloxycarbonyl]-ethylene];

poly [1-[4-[4-(4-methoxy-phenoxycarbonyl)-phenoxy]-butoxycarbonyl]-1-methyl-ethylene-co-1-[6-[4-(3-cyano-2-oxo-2H-1-benzopyran-7-yloxycarbonyl)-phenoxy]-hexyloxycarbonyl]-1-methyl-ethylene];

poly [1-[6-[4-(4-ethoxy-phenoxycarbonyl)-phenoxy]-hexyloxycarbonyl]-1-methyl-ethylene-co-1-methyl-1-[6-[4-(2-oxo-2H-1-benzopyran-7-yloxycarbonyl)-phenoxy]-hexyloxycarbonyl]-ethylene];

poly [1-[6-[4-(4-cyano-phenoxycarbonyl)-phenoxy]-hexyloxycarbonyl]-1-methyl-ethylene-co-1-methyl-1-[6-[4-(2-oxo-2H-1-benzopyran-7-yloxycarbonyl)-phenoxy]-hexyloxycarbonyl]-ethylene];

poly [1-[6-[4-(4-cyano-phenoxycarbonyl)-phenoxy]-hexyloxycarbonyl]-1-methyl-ethylene-co-1-[6-[4-(3-cyano-2-oxo-2H-1-benzopyran-7-yloxycarbonyl)-phenoxy]-hexyloxycarbonyl]-1 -methyl-ethylene];

poly [1-[6-[4-(4-fluoro-phenoxycarbonyl)-phenoxy]-hexyloxycarbonyl]-1-methyl-ethylene-co-1-methyl-1-[6-[4-(2-oxo-2H-1-benzopyran-7-yloxycarbonyl)-phenoxy]-hexyloxycarbonyl]-ethylene];

poly [1-[6-[4-(4-cyano-3-fluoro-phenoxycarbonyl)-phenoxy]-hexyloxycarbonyl]-1-methyl-ethylene-co-1-methyl-1-[6-[4-(2 -oxo-2H-1-benzopyran-7-yloxycarbonyl)-phenoxy]-hexyloxycarbonyl]-ethylene];

poly [1-methyl-1-[6-[4-(4-nitrophenoxycarbonyl)-phenoxy]-hexyloxycarbonyl]-ethylene-co-1-methyl-1-[6-[4-(2-oxo-2H-1 -benzopyran-7-yloxycarbonyl)-phenoxy]-hexyloxycarbonyl]- ethylene];

poly [1-methyl-1-[6-[4-(4-methyl-phenoxycarbonyl)-phenoxy]-hexyloxycarbonyl]-ethylene-co-1-methyl-1-[6-[4-(2-oxo-2H-1-benzopyran-7-yloxycarbonyl)-phenoxy]-hexyloxy- carbonyl]-ethylene];

poly [1-methyl-1-[6-[4-(4-trifluoromethyl-phenoxycarbonyl)-phenoxy]-hexyloxycarbonyl]-ethylene-co-1-methyl-1 -[6-[4-(2-oxo-2H-1-benzopyran-7-yloxycarbonyl)-phenoxy]-hexyloxycarbonyl]-ethylene].

EXAMPLE 9

Poly [1-methyl-1-[6-(2-oxo-2H-1-benzopyran-7-yloxy)-hexyloxycarbonyl]-ethylene

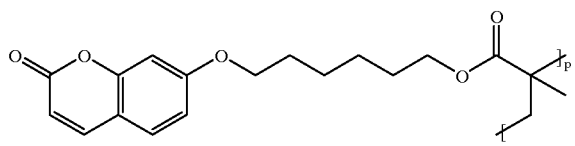

2.03 g (6.14 mol) of 6-(2-oxo-2H-1-benzopyran-7-yloxy)-hexyl 2-methyl-acrylate and 0.01 g (0.061 mmol) of 2,2'-azo-bis-isobutyronitrile (AIBN) were dissolved in 12 ml of N,N-dimethylformamide (DMF). A weak stream of argon was passed through the solution for 30 minutes. Subsequently, the reaction vessel was closed airtight and heated to 55° C. After 20 hours the vessel was opened and the mixture was added dropwise with vigorous stirring at room temperature to 1 l of intensely cooled diethyl ether. The precipitated polymer was filtered off and dried at 50° c. in a water jet vacuum. For further purification, the polymer was dissolved in about 20 ml of chloroform and precipitated in 1.5 l of diethyl ether. This procedure was repeated until monomer was no longer detectable by thin-layer chromatography. Filtration and drying at 50° c. in a vacuum gave 1.61 g of poly [1 -methyl-1-[6-(2-oxo-2H-1-benzopyran-7-yloxy)-hexyloxycarbonyl]-ethylene as a white powder with a glass stage $T_g=40°$ C. ($\Delta c_p=0.4$ J/gK). $\lambda_{max.}$ (in $CH_2Cl_2$)= 321.7 nm ($\epsilon=13620$ l/mol cm).

7-(6-Hydroxy-hexyloxy)-2H-1-benzopyran-2-one

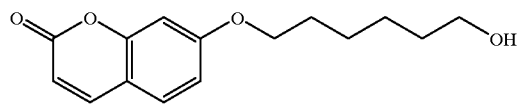

4.87 g (30 mmol) of 7-hydroxy-coumarin, 6.17 g (45.2 mmol) of 6-chlorohexanol and 6.56 g (47.5 mmol) of potassium carbonate were treated with 50 ml of absolute N,N-dimethylformamide and stirred at 100° C. overnight. Subsequently, the batch was poured into water. The white precipitate which separated was filtered off and rinsed with water. The mother liquor was evaporated to dryness in a vacuum, taken up in a small amount of water and extracted several times with ethyl acetate. The precipitate and the ethyl acetate phases were combined, dried over sodium sulphate, evaporated and, for purification, chromatographed on silica gel with an eluent mixture of ethyl acetate and cyclohexane in the ratio 1:1. Therefrom there resulted 7 g of 7-(6-hydroxy-hexyloxy)-2H-1-benzopyran-2-one as white crystals.

6-(2-Oxo-2H-1-benzopyran-7-yloxy)-hexyl 2-methyl-acrylate

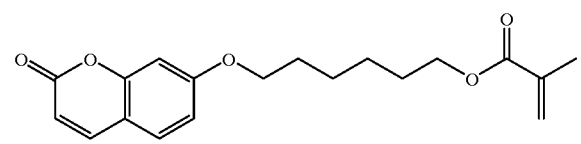

4.2 g (16 mmol) of 7-(6-hydroxy-hexyloxy)-2H-1 -benzopyran-2-one were dissolved in 40 ml of absolute tetrahydrofuran with the exclusion of moisture, treated with 1.82 g (18 mmol) of triethylamine, 0.004 g (0.3 mmol) of 4-dimethylaminopyridine and a spatula tip of 2,6-di-tert.-butyl-p-cresol and cooled to 0° C. 1.7 ml of methacryloyl chloride were added dropwise to this solution within 10 min. The mixture was stirred at 0° C. for one hour and at room temperature for a further hour. Subsequently, the white precipitate which separated was filtered off and rinsed with tetrahydrofuran. The filtrate was evaporated to dryness and the residue was chromatographed on silica gel with acetone/cyclohexane (1:4). In this manner there were obtained 4 g of 6-(2-oxo-2H-1-benzopyran-7-yloxy)-hexyl 2-methyl-acrylate as a colourless liquid. $\lambda_{max.}$ (in $CH_2Cl_2$)=322.7 nm ($\epsilon=15110$ l/mol cm).

The following polymers can be synthesized in an analogous manner:

poly [1-methyl-1-[6-(4-methyl-2-oxo-2H-1-benzopyran-7-yloxy)-hexyloxycarbonyl]-ethylene;

poly [1-methyl-1-[6-(4-trifluoromethyl-2-oxo-2H-1-benzopyran-7-yloxy)-hexyloxycarbonyl]-ethylene;

poly [1-methyl-1-[6-(3,4-dimethyl-2-oxo-2H-1-benzopyran-7-yloxy)-hexyloxycarbonyl]-ethylene;

poly [1-methyl-1-[3-(2-oxo-2H-1-benzopyran-7-yloxy)-propoxycarbonyl]-ethylene;

poly [1-methyl-1-[4-(2-oxo-2H-1-benzopyran-7-yloxy)-butoxycarbonyl]-ethylene;

poly [1-methyl-1-[5-(2-oxo-2H-1-benzopyran-7-yloxy)-pentoxycarbonyl]-ethylene;

poly [1-methyl-1-[7-(2-oxo-2H-1-benzopyran-7-yloxy)-heptyloxycarbonyl]-ethylene;

poly [1-methyl-1-[8-(2-oxo-2H-1-benzopyran-7-yloxy)-octyloxycarbonyl]-ethylene;

poly-[1-[3-(2-oxo-2H-1-benzopyran-7-yloxy)-propoxycarbonyl]-ethylene];

poly-1-[4-(2-oxo-2H-1-benzopyran-7-yloxy)-butoxycarbonyl]-ethylene];

poly-[ 1-[ 5-(2-oxo-2H-1-benzopyran-7-yloxy)-pentoxycarbonyl]-ethylene];

poly-[ 1-[6-(2-oxo-2H-1-benzopyran-7-yloxy)-hexyloxycarbonyl]-ethylene];

poly-[ 1-[7-(2-oxo-2H-1-benzopyran-7-yloxy)-heptyloxycarbonyl]-ethylene];

poly-[ 1-[8-(2-oxo-2H-1-benzopyran-7-yloxy)-octyloxycarbonyl]-ethylene].

EXAMPLE 10

Poly [1-(2-oxo-2H-1-benzopyran-7-yl)-ethylene]

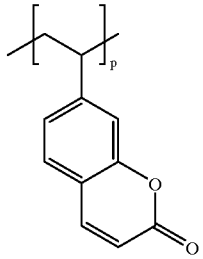

0.4 g (2.3 mmol) of 7-vinyl-2H-1-benzopyran-2-one and 0.0038 g (0.023 mmol) of 2,2'-azo-bis-isobutyronitrile were dissolved in 6.2 ml of N,N-dimethylformamide. A weak stream of argon was passed through the solution for 15 minutes. Subsequently, the reaction vessel was closed airtight and heated to 60° C. After 22 hours the vessel was opened and the mixture was added dropwise to 800 ml of methanol at room temperature while stirring vigorously. The precipitated polymer was filtered off and dried in a water jet vacuum at 60° C. For further purification, the polymer was dissolved in 3 ml, of dichloromethane and precipitated in 800 ml of diethyl ether. This procedure was repeated until monomer was no longer detectable by thin-layer chromatography. Filtration and drying at 60° C. in a vacuum gave 0.175 g of poly [1-(2-oxo-2H-1-benzopyran-7-yl)-ethylene] as a white powder with a glass stage $T_g=211°$ C. ($\Delta c_p=0.26$ J/gK). $\lambda_{max.}$ (in $CH_2Cl_2$)=31 2.6 nm ($\epsilon=7565$ l/mol cm) and 283.3 nm ($\epsilon=9760$ l/mol cm).

The 7-vinyl-2H-1-benzopyran-2-one used as the starting material was prepared as follows:

7-Bromomethyl-2H-1benzopyran-2-one

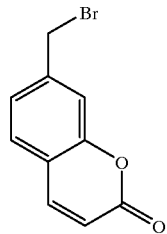

10 g (62.4 mmol) of 7-methyl-coumarin were suspended in 115 ml of carbon tetrachloride. After the addition of 12.2 g (68.7 mmol) of N-bromosuccinimide and 0.122 g (0.5 mmol) of benzoyl peroxide the reaction mixture was boiled under reflux for 7 hours. After cooling to room temperature the mixture was filtered. The residue was washed in succession with carbon tetrachloride and a small amount of diethyl ether and subsequently digested in 500 ml of water. The crude product was filtered off, dried and recrystallized from about 150 ml of acetone. After drying in a water-jet vacuum at 60° C. there were obtained 11 g of 7-bromomethyl-2H-1-benzopyran-2-one as white crystals.

7-Formyl-2H-1-benzopyran-2-one

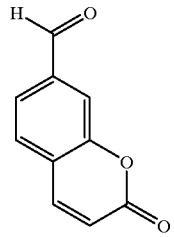

5.13 g (36.6 mmol) of hexamethylenetetramine were dissolved in 30 ml of 50% acetic acid. 7 g (29.3 mmol) of 7-bromomethyl-2H-1-benzopyran-2-one were added portionwise to this solution while stirring. The batch was boiled under reflux for 4 hours and, after cooling to room temperature, filtered. The residue was washed with a large amount of water and dried overnight at 60° C. in a vacuum. This gave 3.14 g of 7-formyl-2H-1-benzopyran-2-one as a fine white powder.

7-Vinyl-2H-1-benzopyran-2-one

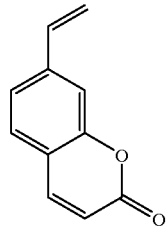

9.23 g (25.8 mmol) of methyltriphenylphosphonium bromide were suspended in 100 ml of tetrahydrofuran with the exclusion of moisture and while gassing with nitrogen and treated cautiously with 3.1 g (27.67 mmol) of potassium tert.-butylate. The batch was stirred at room temperature for 4 hours and then cooled to 0° C. A suspension of 3 g (17.2 mmol) of 7-formyl-2H-1-benzopyran-2-one in 100 ml of tetrahydrofuran was added portionwise to this mixture within 20 min. Subsequently, the mixture was stirred at room temperature overnight. For the working up, the reaction batch was poured into a dilute HCl solution. The HCl phase was extracted several times with dichloromethane. The combined organic extracts were dried over $MgSO_4$ and concentrated to dryness in a vacuum. The eluent used was firstly pure dichloromethane, then a mixture of dichloromethane and diethyl ether in the ratio 9:1. The product fractions were combined, concentrated strongly in a vacuum and treated with cyclohexane. After the majority of the dichloromethane had distilled off, the product crystallized out overnight. It was filtered off, washed with cyclohexane and recrystallized once from an isopropanol/cyclohexane mixture. This gave 0.863 g of 7-vinyl-2H-1-benzopyran-2-one in the form of white crystals.

The following polymers can be synthesized by copolymerization with 7-vinyl-2H-1-benzopyran-2-one:

poly [1-(2-oxo-2H-1-benzopyran-7-yl)-ethylene-co-maleimide];

poly [1-(2-oxo-2H-1-benzopyran-7-yl)-ethylene-co-styrene];

poly [1-(2-oxo-2H-1-benzopyran-7-yl)-ethylene-co-methylmetharylate];

poly [1-(2-oxo-2H-1-benzopyran-7-yl)-ethylene-co-ethylmetharylate];

poly [1-(2-oxo-2H-1-benzopyran-7-yl)-ethylene-co-propylmetharylate];

poly [1-(2-oxo-2H-1-benzopyran-7-yl)-ethylene-co-methylarylate];

poly [1-(2-oxo-2H-1-benzopyran-7-yl)-ethylene-co-ethylarylate];

poly [1-(2-oxo-2H-1-benzopyran-7-yl)-ethylene-co-hexylarylate];

poly [1-(2-oxo-2H-1-benzopyran-7-yl)-ethylene-co-hydroxy-ethylmethacrylate];

poly [1-(2-oxo-2H-1-benzopyran-7-yl)-ethylene-co-methacrylonitrile];

poly [1-(2-oxo-2H-1-benzopyran-7-yl)-ethylene-co-acrylonitrile].

EXAMPLE 11

Poly [1-methyl-1-[2-(4-nitrophenoxy)-ethoxycarbonyl]-ethylene-co-1-methyl-1-[2-(2-oxo-2H-1-benzopyran-7-yloxy)-ethoxycarbonyl]-ethylene] (6:4)

Copolymerization production by polymer-like etherification according to Mitsunobu

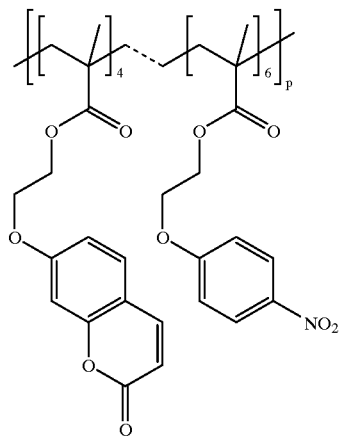

2.5 g (4.1 mmol) of a stock solution of poly (2-hydroxyethyl methacrylate) (21 wt. % in DMA) were diluted with 7.5 ml of dimethylacetamide (DMA). 0.78 g (4.8 mmol) of 7-hydroxy-coumarin, 0.45 g (3.2 mmol) of p-nitrophenol and 2.32 g (8.9 mmol) of triphenylphosphine were dissolved in the reaction batch. The solution was cooled to 0° C. 1.38 ml (8.9 mmol) of diethyl azodicarboxylate (DEAD) were added dropwise within 60 minutes. The reaction batch was left at 0° C. for a further 15 minutes and, after removal of the ice bath, was stirred at room temperature for 72 hours. For the working up, the polymer solution was added dropwise to 1.5 l of methanol while stirring vigorously. The separated polymer was filtered off and dried at 60° C. in a water-jet vacuum. For further purification, the residue was dissolved in 6 ml of dichloromethane and precipitated in 1.5 l of diethyl ether. This procedure was repeated until monomer was no longer detectable by thin-layer chromatography. Filtration and drying at 60° C. in a vacuum gave 0.95 g of poly [1-methyl-1-[2-(4-nitrophenoxy)-ethoxycarbonyl]-ethylene-co-1 -methyl-1-[2-(2-oxo-2H-1-benzopyran-7-yloxy)-ethoxycarbonyl]-ethylene] (6:4) as a white powder with a glass stage $T_g=100°$ C. ($\Delta c_p=0.36$ J/gK). $\lambda_{max.}$ (in $CH_2Cl_2$)=311.2 nm.

The following polymers can be synthesized in an analogous manner:

poly [1-methyl-1-[2-(2-oxo-2H-1-benzopyran-7-yloxy)-ethoxycarbonyl]-ethylene-co-1-methyl-1-[2-(4-phenoxy)-ethoxycarbonyl]-ethylene];

poly [1-methyl-1-[2-(4-methyl-phenoxy)-ethoxycarbonyl]-ethylene-co-1-methyl-1-[2-(2-oxo-2H-1-benzopyran-7-yloxy)-ethoxycarbonyl]-ethylene];

poly [1-methyl-1-[2-(4-methoxy-phenoxy)-ethoxycarbonyl]-ethylene-co-1-methyl-1-[2-(2-oxo-2H-1-benzopyran-7-yloxy)-ethoxycarbonyl]-ethylene];

poly [1-methyl-1-[2-(4-cyano-phenoxy)-ethoxycarbonyl]-ethylene-co-1-methyl-1-[2-(2-oxo-2H-1-benzopyran-7-yloxy)-ethoxycarbonyl]-ethylene];

poly [1-methyl-1-[2-(4-methyl-2-oxo-2H-1-benzopyran-7-yloxy)-ethoxycarbonyl]-ethylene-co-1-methyl-1-[2-(4-phenoxy)-ethoxycarbonyl)-ethylene];

poly [1-methyl-1-[2-(4-methyl-2-oxo-2H-1-benzopyran-7-yloxy)-ethoxycarbonyl]-ethylene-co-1-methyl-1-[2-(4-nitrophenoxy)-ethoxycarbonyl]-ethylene].

What is claimed is:

1. A polymer of the formula

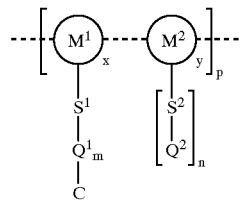

I wherein $M^1$ and $M^2$ signify monomer units for homo- or copolymers;

x and y indicate mole fractions of the comonomers, with in each case $0<x\leq1$ and $0\leq y<1$ and $x+y=1$;

p signifies 4 to 30,000;

$S^1$ and $S^2$ signify spacer units;

$Q^1$ signifies a-structural unit of the formula

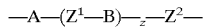

IIa;

$Q^2$ signifies a structural unit of the formula

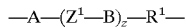

IIb;

A and B each independently signify pyridine-2,5-diyl, pyrimidine-2,5-diyl, 1,4-cyclohexylene, 1,3-dioxane-2,5-diyl or optionally substituted 1,4-phenylene;

$Z^1$ and $Z^2$ each independently signify a single covalent bond, —CH$_2$—CH$_2$—, —CH$_2$O—, —OCH$_2$—, —CONR—, —RNCO—, —COO— or —OOC—;

R signifies hydrogen or lower alkyl;

$R^1$ signifies hydrogen, optionally substituted alkyl or alkoxy with in each case 1 to 12 carbon atoms, cyano, nitro or halogen;

z signifies 0 or 1;

C signifies a photochemically dimerizable quinolinone derivative; and m and n each independently signify 0 or 1.

2. A polymer according to claim 1, wherein the photochemically dimerizable quinolinone derivative (C) signifies a unit of the general formula

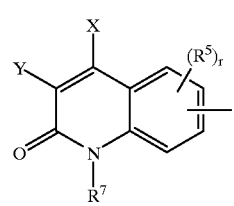

III-B which is linked in the 5-, 6-, 7- or 8-position with the spacer $S^1$ or $Q^1$, and in which $R^5$ signifies optionally substituted alkyl or alkoxy with in each case 1 to 12 carbon atoms, halogen, cyano or nitro;

$R^7$ signifies hydrogen or lower alkyl;

X signifies hydrogen, alkyl or alkoxy with each case 1 to 8 carbon atoms, trifluoromethyl or optionally substituted phenyl;

Y signifies hydrogen, alkyl or alkoxy with in each case 1 to 8 carbon atoms, cyano or —COOR$^6$;

$R^6$ signifies lower alkyl; and r signifies a whole number of 1 to 3.

3. A polymer according to claim 1 of the general formula

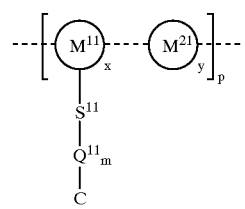

I-A wherein $M^{11}$ and $M^{21}$ each independently signify ethylene, acrylate, methacrylate, 2-chloroacrylate, acrylamide, methacrylamide, 2-chloroacrylamide, styrene derivative, maleic acid derivative, siloxane, and $M^{21}$ also signifies acrylonitrile, methacrylonitrile, methylacrylate, methylmethacrylate, hydroxyalkylacrylate or hydroxyalkylmethacrylate;

$S^{11}$ signifies a single covalent bond, —(CH$_2$)$_t$—, —O(CH$_2$)$_t$—, —(CH$_2$)$_t$O—, —O(CH$_2$)$_t$O—, —OOC(CH$_2$)$_t$—, —COO(CH$_2$)$_t$—, —(CH$_2$)$_t$COO—, —(CH$_2$)$_t$OOC—, —(CH$_2$)$_t$NR$^2$—, cycloalkylene with 5 or 6 carbon atoms, piperidinediyl, piperazinediyl, phenylene, carbonate (—OCOO—), ester (—COO—,—OOC—), amide (—CONR$^2$—, —R$^2$NCO—), ether (—O—), amino (—NR$^2$—) or a combination of these groups, wherein R$^2$ is hydrogen or lower alkyl;

t signifies a whole number of 1 to 6;

$Q^{11}$ signifies —A$^1$—(Z$^{11}$—B$^1$)$_z$—Z$^2$— IIa-1;

$A^1$ and $B^1$ each independently signify 1,4-phenylene, pyridine-2,5-diyl, pyrimidine-2,5-diyl, 1,4-cyclohexylene or 1,3-dioxane-2,5-diyl, with the proviso that not more than one of rings A1 and B1 signifies a heterocycle;

$Z^{11}$ signifies a single covalent bond, —CH$_2$CH$_2$—, —COO— or —OOC—.

4. A polymer according to claim 1 of the formula

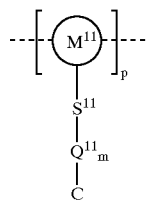   I-B wherein
$M^{11}$ signifies ethylene, acrylate, methacrylate, 2-chloroacrylate, acrylamide, methacrylamide, 2-chloroacrylamide, styrene derivative, maleic acid derivative or siloxane;
$S^{11}$ signifies a single covalent bond, —(CH$_2$)$_t$—, —O(CH$_2$)$_t$—, —(CH$_2$)$_t$O—, —O(CH$_2$)$_t$O—, —OOC(CH$_2$)$_t$—, —COO(CH$_2$)$_t$—, —(CH$_2$)$_t$COO—, —(CH$_2$)$_t$OOC—, —(CH$_2$)$_t$NR$^2$—, cycloalkylene with 5 or 6 carbon atoms, piperidinediyl, piperazinediyl, phenylene, carbonate (—OCOO—), ester (—COO—, —OOC—), amide (—CONR$^2$—, —R$^2$NCO—), ether (—O—), amino (—NR$^2$—) or a combination of these groups, wherein R$^2$ is hydrogen or lower alkyl;
t signifies a whole number of 1 to 6;
$Q^{11}$ signifies —A$^1$—(Z$^1$—B$^1$)$_z$—Z$^2$— IIa-1;
A$^1$ and B$^1$ each independently signify 1,4-phenylene, pyridine-2,5-diyl, pyrimidine-2,5-diyl, 1,4-cyclohexylene or 1,3-dioxane-2,5-diyl, with the proviso that not more than one of rings A$^1$ and B$^1$ signifies a heterocycle;
$Z^{11}$ signifies a single covalent bond, —CH$_2$CH$_2$—, —COO— or —OOC—.

5. A homopolymer according to claim 4, wherein $M^{11}$ signifies ethylene, acrylate, methacrylate, acrylamide, methacrylamide, or styrene derivative; $S^{11}$ signifies a single covalent bond, —(CH$_2$)$_t$—, —O(CH$_2$)$_t$—, —(CH$_2$)$_t$O—, —O(CH$_2$)$_t$O—, —OOC(CH$_2$)$_t$—, —COO(CH$_2$)$_t$—, —(CH$_2$)$_t$COO—, —(CH$_2$)$_t$OOC—, —(CH$_2$)$_t$NR$^2$—, cycloalkylene with 5 or 6 carbon atoms, phenylene, carbonate (—OCOO—), ester (—COO—, —OOC—), amide (—CONR$^2$—, —R$^2$NCO—), ether (—O—), amino (—NR$^2$—) or a combination of these groups; and A$^1$ and B$^1$ each independently signify 1,4-phenylene, pyridine-2,5-diyl, pyrimidine-2,5-diyl or 1,4-cyclohexylene, with the proviso that not more than one of rings A$^1$ and B$^1$ signifies a heterocycle.

6. A polymer of the formula

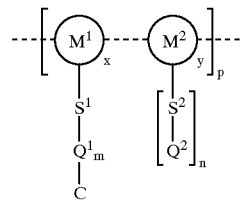   I wherein
$M^1$ and $M^2$ signify monomer units for homo- or copolymers;
x and y indicate mole fractions of the comonomers, within each case $0<x\leq1$ and $0\leq y<1$ and $x+y=1$;
p signifies 4 to 30,000;
$S^1$ and $S^2$ signify spacer units;
$Q^1$ signifies a structural unit of the formula —A—(Z$^1$—B)$_z$—Z$^2$—   IIa;

$Q^2$ signifies a structural unit of the formula

—A—(Z$^1$—B)$_z$—R$^1$—   IIb;

A and B each independently signify pyridine-2,5-diyl, pyrimidine-2,5-diyl, 1,4-cyclohexylene, 1,3-dioxane-2,5-diyl or optionally substituted 1,4-phenylene;
$Z^1$ and $Z^2$ each independently signify a single covalent bond, —CH$_2$—CH$_2$—, —CH$_2$O—, —OCH$_2$— —CONR—, —RNCO—, —COO— or —OOC—;
R signifies hydrogen or lower alkyl;
R$^1$ signifies hydrogen, optionally substituted alkyl or alkoxy with in each case 1 to 12 carbon atoms, cyano, nitro or halogen;
z signifies 0 or 1;
C signifies a photochemically dimerizable coumarin derivative which is linked in the 5-, 6-, 7- or 8-position with the spacer $S^1$ or $Q^1$; and
m and n each independently signify 0 or 1.

7. A polymer according to claim 6, wherein the photochemically dimerizable coumarin derivative (C) signifies a unit of the general formula

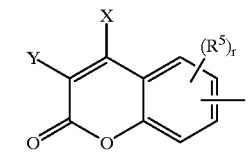   III-A in which
R$^5$ signifies optionally substituted alkyl or alkoxy with in each case 1 to 12 carbon atoms, halogen, cyano or nitro;
X signifies hydrogen, alkyl or alkoxy with each case 1 to 8 carbon atoms, trifluoromethyl or optionally substituted phenyl;
Y signifies hydrogen, alkyl or alkoxy with in each case 1 to 8 carbon atoms, cyano or —COOR$^6$;
R$^6$ signifies lower alkyl; and
r signifies a whole number of 1 to 3.

8. A polymer according to claim 6 of the general formula

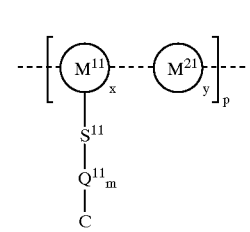   I-A wherein
$M^{11}$ and $M^{21}$ each independently signify ethylene, acrylate, methacrylate, 2-chloroacrylate, acrylamide, methacrylamide, 2-chloroacrylamide, styrene derivative, maleic acid derivative, siloxane, and $M^{21}$ also signifies acrylonitrile, methacrylonitrile, methylacrylate, methylmethacrylate, hydroxyalkylacrylate or hydroxyalkylmethacrylate;

$S^{11}$ signifies a single covalent bond, $-(CH_2)_t-$, $-O(CH_2)_t-$, $-(CH_2)_tO-$, $-O(CH_2)_tO-$, $-OOC(CH_2)_t-$, $-COO(CH_2)_t-$, $-(CH_2)_tCOO-$, $-(CH_2)_tOOC-$, $-(CH_2)_tNR^2-$, cycloalkylene with 5 or 6 carbon atoms, piperidinediyl, piperazinediyl, phenylene, carbonate ($-OCOO-$), ester ($-COO-$, $-OOC-$), amide ($-CONR^2-$, $-R^2NCO-$), ether ($-O-$), amino ($-NR^2-$) or a combination of these groups, wherein $R^2$ is hydrogen or lower alkyl;

t signifies a whole number of 1 to 6;

$Q^{11}$ signifies $-A^1-(Z^{11}-B^1)_z-Z^2-$ IIa-1;

$A^1$ and $B^1$ each independently signify 1,4-phenylene, pyridine-2,5-diyl, pyrimidine-2,5-diyl, 1,4-cyclohexylene or 1,3-dioxane-2,5-diyl, with the proviso that not more than one of rings $A^1$ and $B^1$ signifies a heterocycle;

$Z^{11}$ signifies a single covalent bond, $-CH_2CH_2-$, $-COO-$ or $-OOC-$.

9. A polymer according to claim 6 of the formula

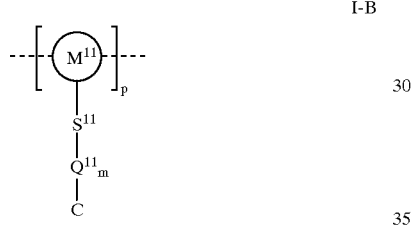

I-B wherein $M^{11}$ signifies ethylene, acrylate, methacrylate, 2-chloroacrylate, acrylamide, methacrylamide, 2-chloroacrylamide, styrene derivative, maleic acid derivative or siloxane;

$S^{11}$ signifies a single covalent bond, $-(CH_2)_t-$, $-O(CH_2)_t-$, $-(CH_2)_tO-$, $-O(CH_2)_tO-$, $-OOC(CH_2)_t-$, $-COO(CH_2)_t-$, $-(CH_2)_tCOO-$, $-(CH_2)_tOOC-$, $-(CH_2)_tNR^2-$, cycloalkylene with 5 or 6 carbon atoms, piperidinediyl, piperazinediyl, phenylene, carbonate ($-OCOO-$), ester ($-COO-$, $-OOC-$), amide ($-CONR^2-$, $-R^2NCO-$), ether ($-O-$), amino ($-NR^2-$) or a combination of these groups, wherein $R^2$ is hydrogen or lower alkyl;

t signifies a whole number of 1 to 6;

$Q^{11}$ signifies $-A^1-(Z^{11}-B^1)_z-Z^2$ _IIa-1;

$A^1$ and $B^1$ each independently signify 1,4-phenylene, pyridine-2,5-diyl, pyrimidine-2,5-diyl, 1,4-cyclohexylene or 1,3-dioxane-2,5-diyl, with the proviso that not more than one of rings $A^1$ and $B^1$ signifies a heterocycle;

$Z^{11}$ signifies a single covalent bond, $-CH_2CH_2-$, $-COO-$ or $-OOC-$.

10. A homopolymer according to claim 9, wherein $M^{11}$ signifies ethylene, acrylate, methacrylate, acrylamide, methacrylamide, or styrene derivative; $S^{11}$ signifies a single covalent bond, $-(CH_2)_t-$, $-O(CH_2)_t-$, $-(CH_2)_tO-$, $-O(CH_2)_tO-$, $-OOC(CH_2)_t-$, $-COO(CH_2)_t-$, $-(CH_2)_tCOO-$, $-(CH_2)_tOOC-$, $-(CH_2)_tNR^2-$, cycloalkylene with 5 or 6 carbon atoms, phenylene, carbonate ($-OCOO-$), ester ($-COO-$, $-OOC-$), amide ($-CONR^2-$, $-R^2NCO-$), ether ($-O-$), amino ($-NR^2-$) or a combination of these groups; and $A^1$ and $B^1$ each independently signify 1,4-phenylene, pyridine-2,5-diyl, pyrimidine-2,5-diyl or 1,4-cyclohexylene, with the proviso that not more than one of rings $A^1$ and $B^1$ signifies a heterocycle.

11. A homopolymer according to claim 9, wherein the coumarin derivative (C) is linked in the 6- or 7- position with spacer $S^{11}$ or with $Z^2$, of the formula

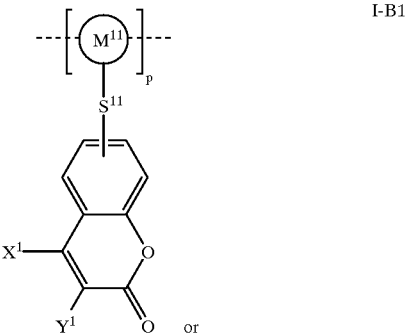

I-B1 or

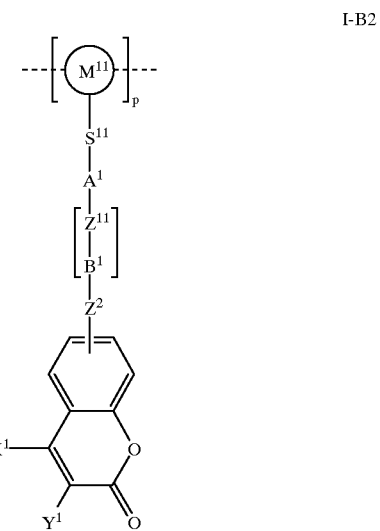

I-B2 wherein $X^1$ signifies hydrogen, alkyl or alkoxy with in each case 1 to 4 carbon atoms or trifluoromethyl;

$Y^1$ signifies hydrogen, alkyl or alkoxy with in each case 1 to 4 carbon atoms $S^{11}$ signifies a single covalent bond, $-(CH_2)_t-$, $-O(CH_2)_t-$, $-(CH_2)_tO-$, $-O(CH_2)_tO-$, $-OOC(CH_2)_t-$, $-COO(CH_2)_t-$, $-(CH_2)_tCOO-$, $-(CH_2)_tOOC-$, $-(CH_2)_tNR^2-$, cycloalkylene with 5 or 6 carbon atoms, piperidinediyl, piperazinediyl, phenylene, carbonate ($-OCOO-$), ester ($-COO-$, $-OOC-$), amide ($-CONR^2-$, $-R^2NCO-$), ether ($-O-$), amino ($-NR^2-$) or a combination of these groups, wherein $R^2$ is hydrogen or lower alkyl.

12. A homopolymer according to claim 11, wherein $X^1$ signifies hydrogen, alkyl or alkoxy with in each case 1 to 4 carbon atoms; $Y^1$ signifies hydrogen or alkyl with 1 to 4 carbon atoms; $M^{11}$ signifies ethylene, acrylate, methacrylate or styrene; $A^1$ and $B^1$ signify phenylene or cyclohexylene; and $S^{11}$ signifies a single covalent bond, $-(CH_2)_t-$, $-(CH_2)_tO-$, $-(CH_2)_tCOO-$, $-(CH_2)_tOOC-$, $-(CH_2)_tNR^2-$ or amino ($-NR^2-$).

13. A polymer according to claim 7, wherein the coumarin derivative (C) of formula III-A is linked in the 7-position with the spacer $S^1$ or with $Z^2$.

14. The homopolymer poly [1-methyl-1-(2-oxo-2H-1-benzopyran-7-yloxy-carbonyl)-ethylene];

poly [1-methyl-1-(4-methyl-2-oxo-2H-1-benzopyran-7-yloxycarbonyl)-ethylene];

poly [1-methyl-1-[2-(2-oxo-2H-1-benzopyran-7-yloxy)-ethoxycarbonyl]-ethylene];

poly [1-[2-(3-ethoxycarbonyl-2-oxo-2H-1-benzopyran-7-yloxy)-ethoxycarbonyl]-1-methyl-ethylene];

poly [1-methyl-1-[2-(4-methyl-2-oxo-2H-1-benzopyran-7-yloxy)-ethoxycarbonyl]-ethylene];

poly [1-[2-(4-ethyl-2-oxo-2H-1-benzopyran-7-yloxy)-ethoxycarbonyl]-1-methyl-ethylene];

poly [1-methyl-1-[2-(4-trifluoromethyl-2-oxo-2H-1-benzopyran-7-yloxy)-ethoxycarbonyl]-ethylene];

poly [1-[2-(3-chloro-4-methyl-2-oxo-2H-1-benzopyran-7-yloxy)-ethoxycarbonyl]-1-methyl-ethylene];

poly [1-methyl-1-[2-(4-methyl-8-nitro-2-oxo-2H-1-benzopyran-7-yloxy)-ethoxycarbonyl]-ethylene];

poly [1-methyl-1-[2-(3,4,8-trimethyl-2-oxo-2H-1-benzopyran-7-yloxy)-ethoxycarbonyl]-ethylene];

poly [1-methyl-1-[4-(2-oxo-2H-1-benzopyran-7-yloxy)-piperidin-1-ylcarbonyl]-ethylene];

poly [1-methyl-1-[6-[4-(2-oxo-2H-1-benzopyran-7-yloxy-carbonyl)-phenoxy]-hexyloxycarbonyl]-ethylene];

poly [oxy-methyl-[4-[4-(2-oxo-2H-1-benzopyran-7-yloxy-carbonyl)-phenoxy]-butyl]-silene;

poly [1-methyl-1-[6-(2-oxo-2H-1-benzopyran-7-yloxy)-hexyloxycarbonyl]-ethylene; or poly [1-(2-oxo-2H-1-benzopyran-7-yl)-ethylene].

\* \* \* \* \*

UNITED STATES PATENT AND TRADEMARK OFFICE
CERTIFICATE OF CORRECTION

PATENT NO.   : 6,201,087 B1
DATED        : March 13, 2001
INVENTOR(S)  : Rolf Peter Herr et al.

It is certified that error appears in the above-identified patent and that said Letters Patent is hereby corrected as shown below:

Title page,
Item [57], ABSTRACT,
Line 11, "1,4–Cyclohexylene" should read -- 1,4–cyclohexylene --;
Line 12, ""Z"" should read -- "$Z^1$" --.
Line 14, "–$CH_2$-ch$_2$–" should read -- –$CH_2$-$CH_2$– --.

Column 33, claim 1,
Line 45, –A–($Z^1$–B)–$_z$–$Z^2$–" should read -- –A–($Z^1$–B)$_z$–$Z^2$– --.
Line 57, after "–$OCH_2$–", insert a comma.

Column 34, claim 3,
Line 64, "A1 and B1" should read -- $A^1$ and $B^1$ --.

Column 35, claim 4,
Line 20, "–(C $H_2$)tCOO–" should read -- –($CH_2$)$_t$COO– --.
Line 28, "–$A^1$–($Z^1$–$B^1$)$_z$–$Z^2$–IIa-1;" should read -- –$A^1$–($Z^{11}$–$B^1$)$_z$–$Z^2$–   IIa-1; --.

Column 35, claim 5,
line 41, "–OOC(C $H_2$)$_t$–" should read -- –OOC($CH_2$)$_t$– --.

Column 36, claim 6,
Line 16, "hu 1 and" should read -- $Z^1$ and --.
Line 17, after "–$OCH_2$–", insert a comma.

Column 37, claim 9,
Line 53, "–$A^1$–($Z^{11}$–$B^1$)$_z$–$Z^2$ _IIa-1;" should read -- –$A^1$–($Z^{11}$–$B^1$)$_z$–$Z^2$–   IIa-1; --.

UNITED STATES PATENT AND TRADEMARK OFFICE
CERTIFICATE OF CORRECTION

PATENT NO. : 6,201,087 B1
DATED : March 13, 2001
INVENTOR(S) : Rolf Peter Herr et al.

It is certified that error appears in the above-identified patent and that said Letters Patent is hereby corrected as shown below:

Column 38, claim 11,
In the structure for formula I-B2, $$\begin{bmatrix} Z^{11} \\ | \\ B^1 \end{bmatrix}'' \quad \text{should read} \quad -\begin{bmatrix} Z^{11} \\ | \\ B^1 \end{bmatrix}_z--$$

Signed and Sealed this

Twenty-second Day of January, 2002

Attest:

JAMES E. ROGAN
*Attesting Officer*     *Director of the United States Patent and Trademark Office*